(12) United States Patent
Qiu et al.

(10) Patent No.: US 12,407,602 B2
(45) Date of Patent: Sep. 2, 2025

(54) FORWARDING ENTRY GENERATION METHOD, PACKET SENDING METHOD, NETWORK DEVICE, AND SYSTEM

(71) Applicant: HUAWEI TECHNOLOGIES CO., LTD., Guangdong (CN)

(72) Inventors: Jun Qiu, Shenzhen (CN); Zhibo Hu, Beijing (CN); Chuang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 17/890,651

(22) Filed: Aug. 18, 2022

(65) Prior Publication Data

US 2022/0407801 A1 Dec. 22, 2022

Related U.S. Application Data

(63) Continuation of application No. PCT/CN2020/118633, filed on Sep. 29, 2020.

(30) Foreign Application Priority Data

Feb. 21, 2020 (CN) .......................... 202010106211.9
Apr. 15, 2020 (CN) .......................... 202010295809.7

(Continued)

(51) Int. Cl.
*H04L 45/00* (2022.01)
*H04L 45/02* (2022.01)
(Continued)

(52) U.S. Cl.
CPC .............. *H04L 45/22* (2013.01); *H04L 45/02* (2013.01); *H04L 45/12* (2013.01); *H04L 45/247* (2022.05);
(Continued)

(58) Field of Classification Search
CPC ......... H04L 45/02; H04L 45/12; H04L 45/22; H04L 45/26; H04L 45/28; H04L 45/741
See application file for complete search history.

(56) References Cited

U.S. PATENT DOCUMENTS 10,841,220 B1 * 11/2020 Filsfils .................... H04L 45/64
2006/0126496 A1 6/2006 Filsfils et al.
(Continued)

FOREIGN PATENT DOCUMENTS

CN 101599898 A 12/2009
CN 104426771 A 3/2015
(Continued)

OTHER PUBLICATIONS

C. Filsfils, Ed et al., SRv6 NET-PGM extension: Insertion, draft-filsfils-spring-srv6-net-pgm-insertion-02, SPRINGInternet—Draft, Jan. 15, 2020, 12 pages.
(Continued)

*Primary Examiner* — Donald L Mills
(74) *Attorney, Agent, or Firm* — WOMBLE BOND DICKINSON (US) LLP

(57) ABSTRACT

This application discloses a forwarding entry generation method, a packet sending method, a network device, and a system, so that a specified network device cannot use a backup forwarding path to forward a packet, thereby reducing, to some extent, a technical problem such as network resource waste or network congestion caused by a loop problem. The method includes: A first network device obtains routing information advertised by a second network device; and the first network device determines that the routing information advertised by the second network device matches a summary route stored in the first network device, and generates, based on a segment identifier of the second network device, a forwarding entry corresponding to the summary route. The forwarding entry includes the segment (Continued)

identifier of the second network device, and a forwarding path corresponding to the forwarding entry passes through the second network device.

29 Claims, 25 Drawing Sheets

(30) Foreign Application Priority Data

May 29, 2020 (CN) .......................... 202010478986.9
Jul. 22, 2020 (CN) .......................... 202010711897.4

(51) Int. Cl.
*H04L 45/12* (2022.01)
*H04L 45/247* (2022.01)
*H04L 45/28* (2022.01)
*H04L 45/74* (2022.01)
*H04L 45/741* (2022.01)

(52) U.S. Cl.
CPC .............. *H04L 45/26* (2013.01); *H04L 45/28* (2013.01); *H04L 45/74* (2013.01); *H04L 45/741* (2013.01)

(56) References Cited

U.S. PATENT DOCUMENTS

| | | |
|---|---|---|
| 2007/0091796 A1 | 4/2007 | Filsfils et al. |
| 2009/0245259 A1 | 10/2009 | Filsfils et al. |
| 2016/0173366 A1 | 6/2016 | Saad et al. |
| 2017/0054626 A1* | 2/2017 | Sivabalan ............... H04L 45/64 |
| 2018/0351863 A1* | 12/2018 | Vairavakkalai ....... H04L 45/745 |
| 2018/0351864 A1* | 12/2018 | Jeganathan ........... H04L 45/021 |
| 2019/0007372 A1 | 1/2019 | Bhat et al. |
| 2021/0092053 A1* | 3/2021 | Filsfils ................... H04L 45/74 |
| 2023/0043743 A1* | 2/2023 | Psenak ................... H04L 45/12 |

FOREIGN PATENT DOCUMENTS

| | | |
|---|---|---|
| CN | 104579942 A | 4/2015 |
| CN | 106559324 A | 4/2017 |
| CN | 107864091 A | 3/2018 |
| CN | 107872332 A | 4/2018 |
| CN | 108390828 A | 8/2018 |
| CN | 109561021 A | 4/2019 |
| CN | 109981458 A | 7/2019 |
| CN | 110113259 A | 8/2019 |
| CN | 110324165 A | 10/2019 |
| CN | 110535782 A | 12/2019 |
| CN | 110677345 A | 1/2020 |
| CN | 110752993 A | 2/2020 |
| JP | 2012195627 A | 10/2012 |
| JP | 2016092756 A | 5/2016 |
| JP | 2016149634 A | 8/2016 |
| WO | 2016050031 A1 | 4/2016 |
| WO | 2019196653 A1 | 10/2019 |
| WO | 2020024828 A1 | 2/2020 |

OTHER PUBLICATIONS

C. Filsfils, Ed et al., SRv6 Network Programming, draft-ietf-spring-srv6-network-programming-15, SPRINGInternet—Draft, Mar. 27, 2020, 39 pages.

Request for Comments: 4915, P. Psenak et al., Multi-Topology (MT) Routing in OSPF, Network Working Group, Jun. 2007, 20 pages.

RFC 8665, P. Psenak, Ed et al., OSPF Extensions for Segment Routing, Internet Engineering Task Force (IETF), Dec. 2019, 25 pages.

RFC 8667, S. Previdi, Ed et al., IS-IS Extensions for Segment Routing, Internet Engineering Task Force (IETF), Dec. 2019, 28 pages.

* cited by examiner

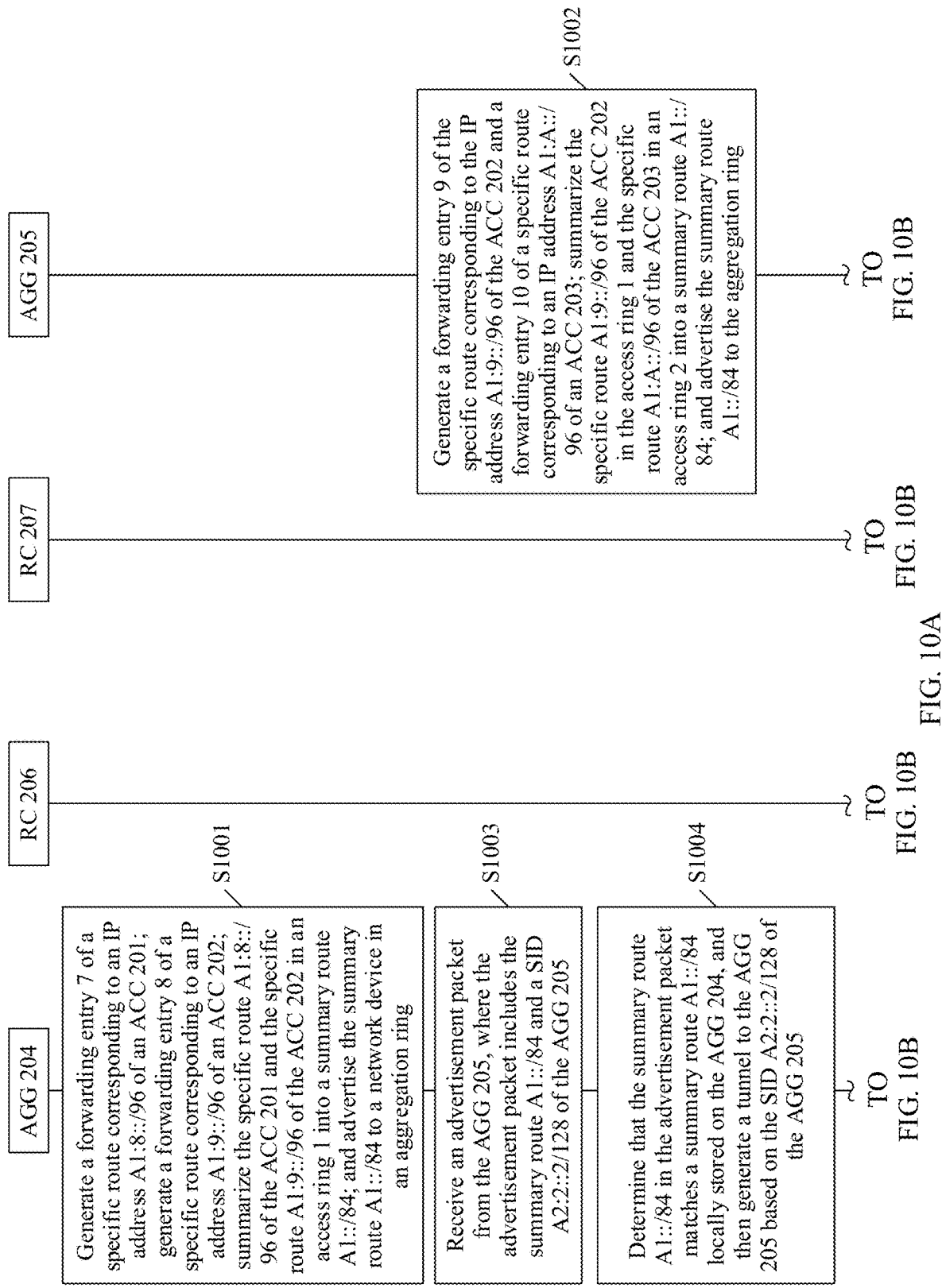

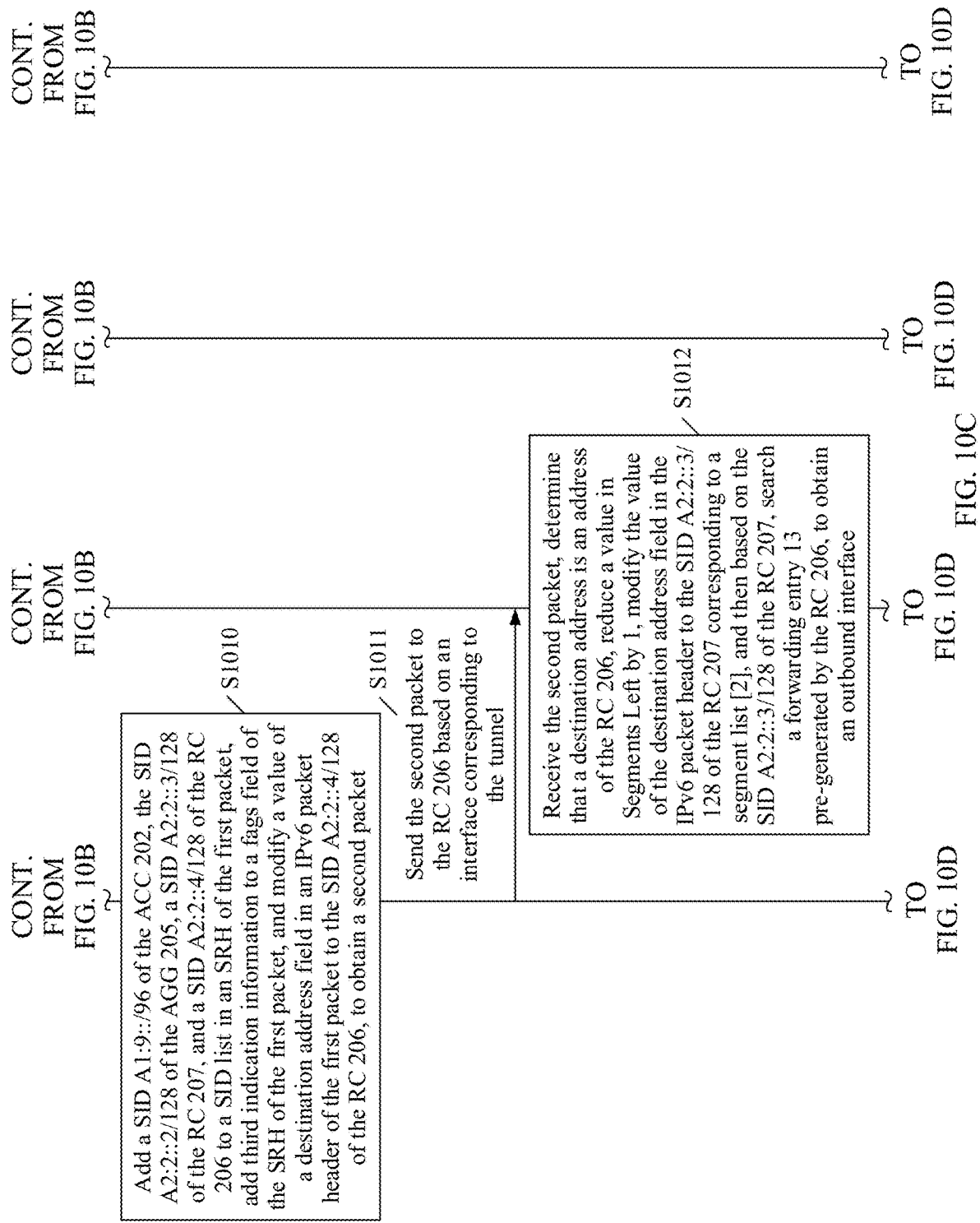

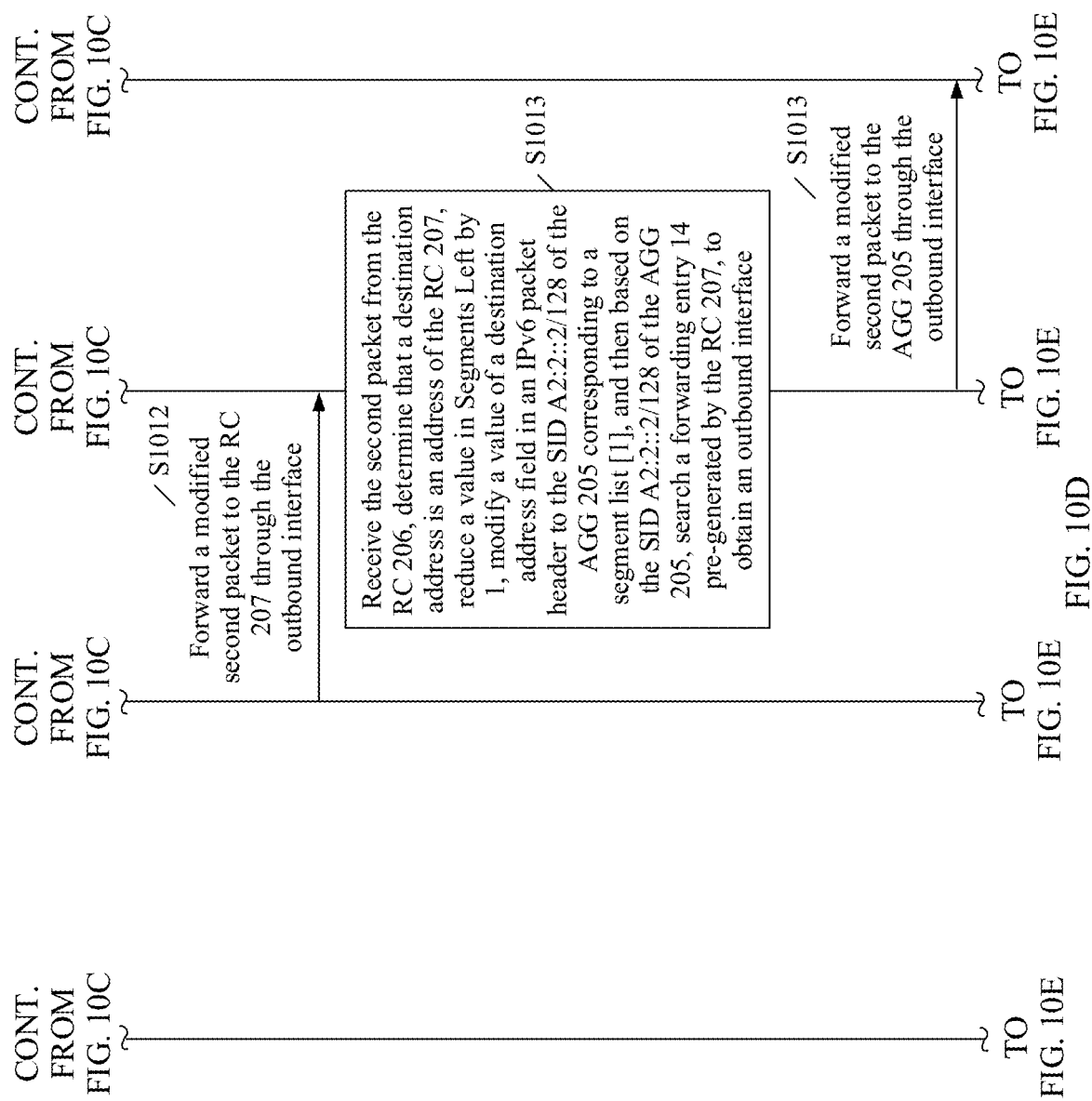

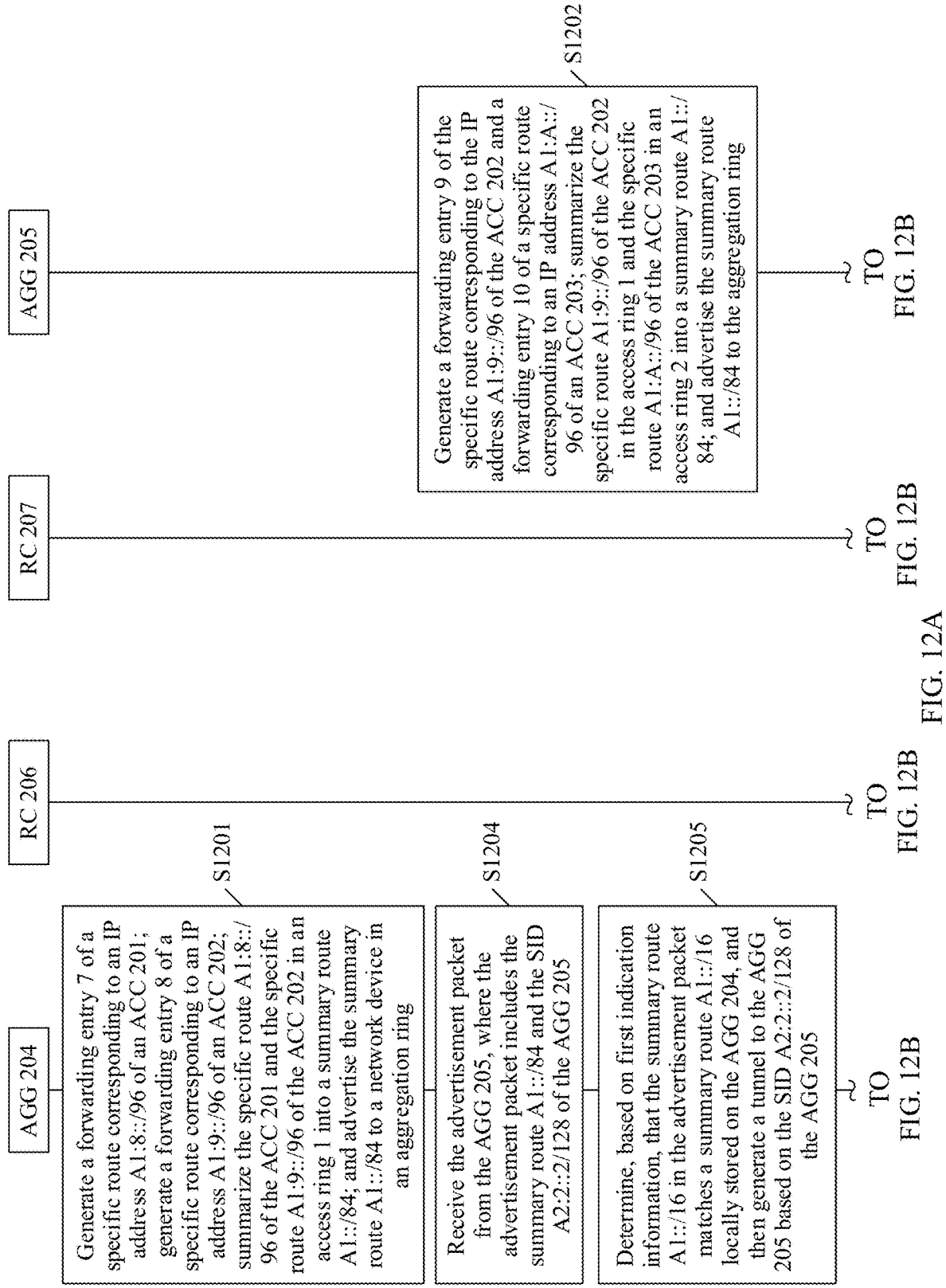

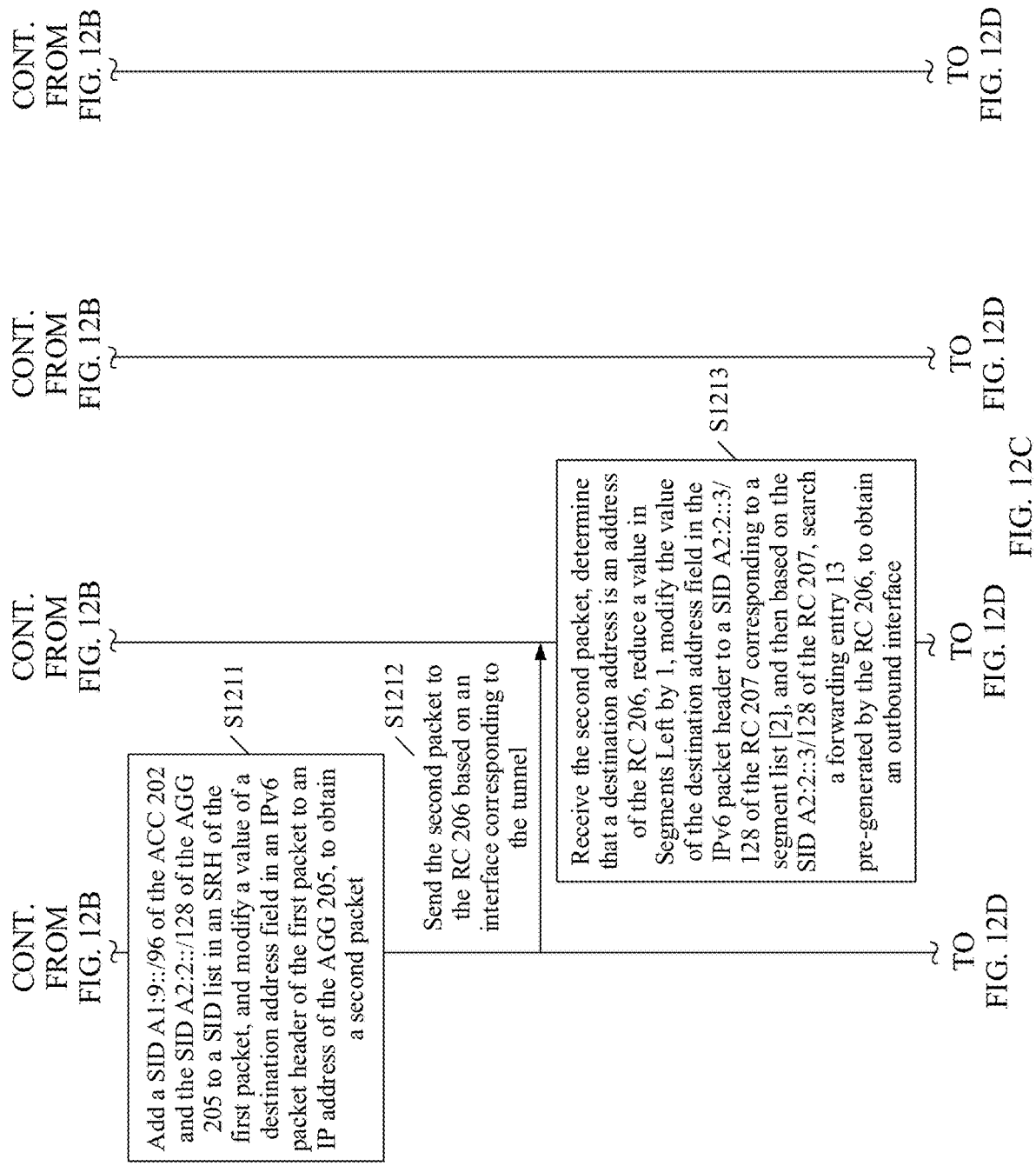

CONT. FROM FIG. 12D

CONT. FROM FIG. 12D

CONT. FROM FIG. 12D

CONT. FROM FIG. 12D

S1214 — Receive the second packet from the RC 207, determine that a destination address is an address of the AGG 205, reduce a value in Segments Left by 1, modify the value of the destination address field in the IPv6 packet header to the IP address A1:9::/96 of the ACC 202 corresponding to a segment list [0], and then based on the IP address A1:9::/96 of the ACC 202 in the second packet, determine whether the primary forwarding path to the ACC 202 is reachable; and if yes, send the second packet to the ACC 202 by using the primary forwarding path; or if no, obtain third indication information based on the SID A2:2::2/128 of the AGG 205 and the correspondence stored in the AGG 205, and avoid using a backup forwarding path to forward the second packet based on an indication of the third indication information

FIG. 12E

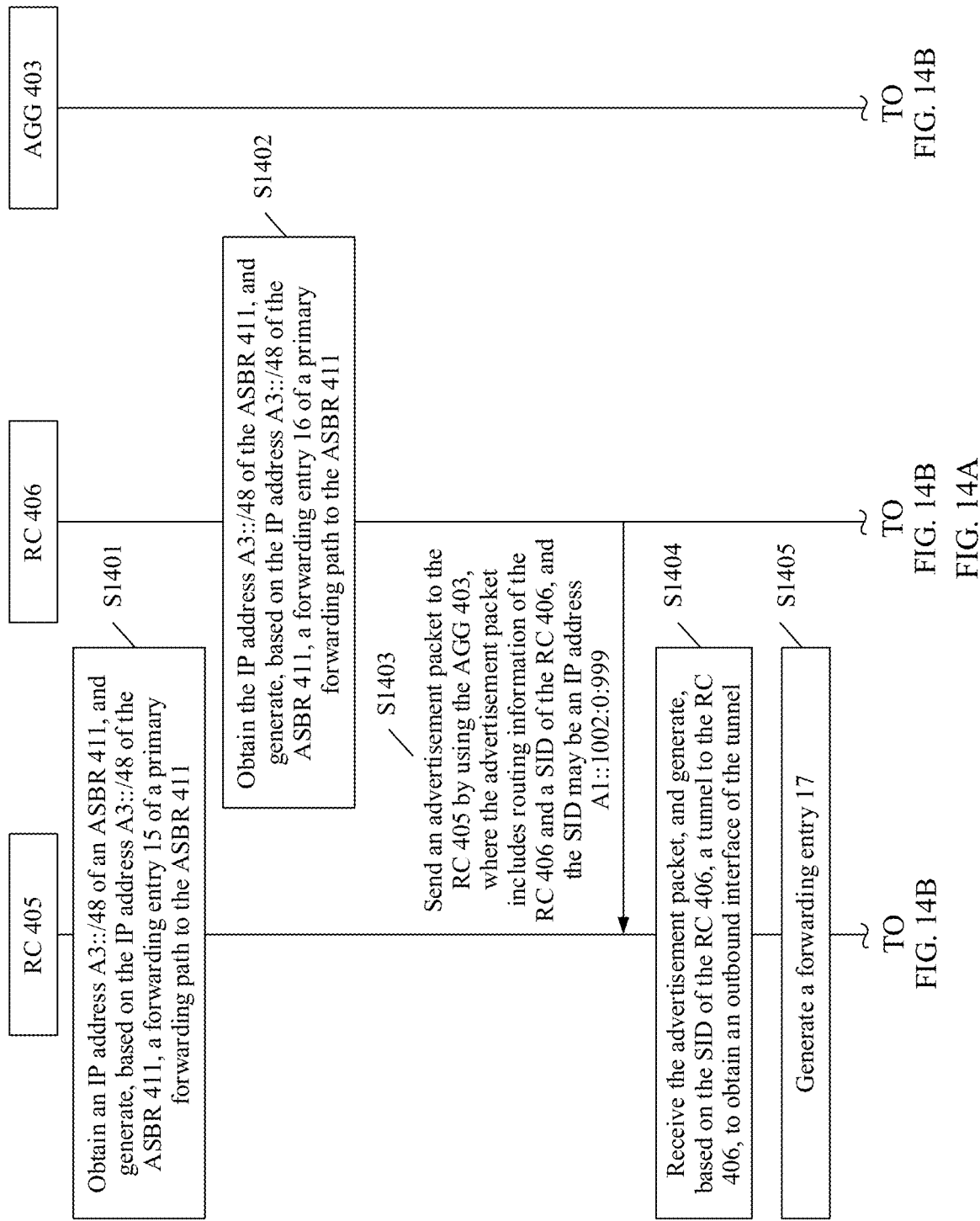

CONT. FROM FIG. 14A

CONT. FROM FIG. 14A

CONT. FROM FIG. 14A

S1406 — Receive a first packet from the AGG 403, where the first packet includes the IP address A3::/48 of the ASBR 411

S1407 — Determine, based on the IP address of the ASBR 411, that the primary forwarding path (namely, an outbound interface of a direct link to an ASBR 407) to the ASBR 411 is faulty (for example, the forwarding entry 15 fails to be obtained through matching): and then the RC 405 obtains the forwarding entry 17 through matching based on the IP address of the ASBR 411, to obtain a SID A1::1002:0:888 of the AGG 403, a SID A1::1002:0:999 of the RC 406, and the outbound interface of the tunnel S1408 — Add a SID list to an SRH of the first packet, where the SID list includes the IP address A3::/48 of the ASBR 411, the SID A1::1001:0:888 of the AGG 403, the SID A1::1002:0:999 of the RC 406, and third indication information, and modify a destination address of the first packet to an IP address A1::1001:0:888 of the AGG 403, to obtain a second packet

TO FIG. 14C

S1409 — Send the second packet to the AGG 403

FORWARDING ENTRY GENERATION METHOD, PACKET SENDING METHOD, NETWORK DEVICE, AND SYSTEM

CROSS-REFERENCE TO RELATED APPLICATIONS

This application is a continuation of International Application No. PCT/CN2020/118633 filed on Sep. 29, 2020, which claims priority to Chinese Patent Application No. 202010106211.9, filed on Feb. 21, 2020, and Chinese Patent Application No. 202010295809.7, filed on Apr. 15, 2020 and Chinese Patent Application No. 202010711897.4, filed on Jul. 22, 2020 and Chinese Patent Application No. 202010478986.9, filed on May 29, 2020. All of the aforementioned patent applications are hereby incorporated by reference in their entireties.

TECHNICAL FIELD

This application relates to the communications field, and in particular, to a forwarding entry generation method, a packet sending method, a network device, and a system.

BACKGROUND

To improve network transmission reliability, in some network scenarios, a network device forwards a packet by using a primary forwarding path and a backup forwarding path. If the primary forwarding path is normal, the packet is forwarded by using the primary forwarding path. If the primary forwarding path is faulty, the packet is forwarded by using the backup forwarding path. However, in some scenarios, forwarding a packet by using the backup forwarding path causes network resource waste or network congestion. For example, in some network scenarios, forwarding a packet by using the backup forwarding path may cause a loop problem of packet forwarding, resulting in network congestion or network bandwidth resource waste.

For example, refer to FIG. 1. A primary forwarding path between a network device 101 and a network device 102 is a direct link between the network device 101 and the network device 102, and a backup forwarding path between the network device 101 and the network device 102 passes through a network device 103, that is, the backup forwarding path is the network device 101→the network device 103→the network device 102. When the primary forwarding path from the network device 101 to the network device 102 is faulty, a loop problem may occur when the network device 101 forwards a packet to the network device 102 via the network device 103 on the backup forwarding path. The loop problem means that after the network device 103 receives the packet from the network device 101, the network device 103 returns the packet to the network device 101 for some reasons instead of sending the packet to the network device 102. A loop problem is more likely to occur when some network devices at special locations of a network, for example, network devices connected to an access network and a backbone network, use the backup forwarding path to forward a packet.

Therefore, how to avoid network resource waste or network congestion caused by the loop problem is a technical problem that needs to be resolved currently.

SUMMARY

Embodiments of this application provide a forwarding entry generation method, a packet sending method, a network device, and a system, to generate a forwarding entry corresponding to a summary route, where the forwarding entry includes a segment identifier of a specified network device, so that a packet is forwarded to the specified network device based on the segment identifier of the specified network device in the forwarding entry during packet forwarding. This avoids, to some extent, a problem that a loop occurs in a process of forwarding the packet to the specified network device.

According to a first aspect, a forwarding entry generation method is provided. The method may be applied to a first network device. The first network device obtains routing information advertised by a second network device; and when it is determined that the routing information advertised by the second network device matches a summary route stored in the first network device, the first network device generates, based on a segment identifier of the second network device, a forwarding entry corresponding to the summary route. The forwarding entry includes the segment identifier of the second network device, and a forwarding path corresponding to the forwarding entry passes through the second network device. After receiving a first packet, the first network device obtains the summary route through matching based on a destination address of the first packet, adds the segment identifier of the second network device in the forwarding entry to the first packet to obtain a second packet, and forwards the second packet to the second network device, so that the second packet can be forwarded to the second network device. In this way, the second network device forwards the second packet to a destination device. Because the second packet carries the segment identifier of the second network device, the second packet can reach the second network device, and the second network device can forward the second packet to the destination device. This avoids a problem that a loop occurs before the second packet is sent to the second network device, thereby saving network resources or reducing a possibility of network congestion.

In an embodiment, before that the first network device generates, based on a segment identifier of the second network device, a forwarding entry corresponding to the summary route, the first network device receives a first advertisement packet. The first advertisement packet includes the segment identifier of the second network device. The first advertisement packet is, for example, an open shortest path first (OSPF) packet or an intermediate system to intermediate system (ISIS) packet. After receiving the first advertisement packet, the first network device may obtain the segment identifier of the second network device from the first advertisement packet, to add the segment identifier of the second network device to the forwarding entry. This achieves an objective of saving network resources or reducing a possibility of network congestion.

In an embodiment, the first advertisement packet further includes first indication information. Correspondingly, the first network device may match, based on the first indication information, the routing information advertised by the second network device against the summary route stored in the first network device, and when it is determined that the routing information advertised by the second network device matches the summary route stored in the first network device, generate, based on the segment identifier of the second network device, the forwarding entry corresponding to the summary route. The first advertisement packet includes the first indication information, so that system resources of the first network device can be saved to some extent.

In an embodiment, in addition to the segment identifier of the second network device, the first advertisement packet further includes the routing information advertised by the second network device. Therefore, the first network device may obtain, from the first advertisement packet, the routing information advertised by the second network device, and match the routing information sent by the second network device against the summary route stored in the first network device.

In an embodiment, when the first advertisement packet includes the segment identifier of the second network device, but does not include the routing information advertised by the second network device, the first advertisement packet further includes a device identifier of the second network device. The device identifier of the second network device is, for example, a router identifier (ID) or a system identifier (system identifier, system ID). The first network device obtains, based on the device identifier of the second network device and a correspondence, the routing information advertised by the second network device. The correspondence is a correspondence between the device identifier of the second network device and the routing information advertised by the second network device. After obtaining the routing information advertised by the second network device, the first network device may match the routing information sent by the second network device against the summary route stored in the first network device.

In an embodiment, the correspondence between the device identifier of the second network device and the routing information advertised by the second network device may be obtained by performing the following operations. The first network device receives a second advertisement packet, where the second advertisement packet includes the device identifier of the second network device and the routing information advertised by the second network device; and the first network device generates the correspondence based on the device identifier of the second network device and the routing information advertised by the second network device.

In an embodiment, the first advertisement packet includes a segment routing (SR) over Internet protocol version 6 (Internet Protocol version 6, IPv6) ("SRv6" for short below) endpoint segment identifier (End SID) type length value (TLV), and the first indication information is carried in a flags field, an endpoint behavior field, or a reserved field in the SRv6 END SID TLV.

In an embodiment, the first advertisement packet includes a non-bypass (NoBypass) SID TLV. A type field of the NoBypass SID TLV carries the first indication information; or a Type field in the NoBypass SID TLV carries second indication information, an Endpoint Behavior field in the NoBypass SID TLV carries the first indication information, and the second indication information is used to indicate that the Endpoint Behavior field carries the first indication information.

In an embodiment, the forwarding entry is a backup forwarding entry corresponding to the summary route, a primary forwarding entry corresponding to the summary route does not pass through the second network device. The first network device sets the primary forwarding entry to an unavailable state, so that the first network device can use the backup forwarding entry to forward a packet. This avoids a phenomenon that a loop occurs because the primary forwarding entry is used to forward a packet, saves network resources, and reduces a possibility of network congestion.

In an embodiment, the forwarding entry is the backup forwarding entry corresponding to the summary route, and the primary forwarding entry is a forwarding entry corresponding to a specific route of the destination device. If a primary forwarding path corresponding to the primary forwarding entry is faulty, the first network device may forward a packet to the destination device by using the backup forwarding entry.

In an embodiment, the first network device determines that a prefix in the routing information advertised by the second network device is the same as a prefix of the summary route and that a mask in the routing information advertised by the second network device is the same as a mask of the summary route. That is, when both the prefix and the mask of the routing information advertised by the second network device and the prefix and the mask of the summary route stored in the first network device are the same, the first network device determines that the two match.

In an embodiment, the first network device forwards a packet based on the forwarding entry. The packet includes third indication information, and the third indication information is used to indicate the second network device to avoid using a backup forwarding path from the second network device to the destination device to forward the packet. This further avoids a loop problem that may occur in a process in which the second network device forwards a packet by using a backup forwarding path.

According to a second aspect, a packet sending method is provided. A second network device generates a first advertisement packet, where the first advertisement packet includes a segment identifier of the second network device; and the second network device sends the first advertisement packet to a first network device. The first advertisement packet is used to indicate the first network device to generate, when it is determined that routing information advertised by the second network device matches a summary route stored in the first network device, a forwarding entry corresponding to the summary route; the forwarding entry includes the segment identifier of the second network device; and a forwarding path corresponding to the forwarding entry passes through the second network device. Because the forwarding entry corresponding to the summary route includes the segment identifier of the second network device, the first network device may add the segment identifier of the second network device to the packet, so that the packet can be forwarded to the second network device. This avoids a problem that a loop occurs before the packet is sent to the second network device, and then saves network resources or reduces a possibility of network congestion.

In an embodiment, the first advertisement packet further includes first indication information, and the first indication information is used to indicate the first network device to generate, when it is determined that the routing information advertised by the second network device matches the summary route stored in the first network device, the forwarding entry based on the segment identifier of the second network device. The first advertisement packet includes the first indication information, so that system resources of the first network device can be saved to some extent.

In an embodiment, the first advertisement packet includes an SRv6 END SID TLV, and the first indication information is carried in a flags field, an endpoint behavior field, or a reserved field in the SRv6 END SID TLV.

In an embodiment, the first advertisement packet includes a NoBypass SID TLV. A type field of the NoBypass SID TLV field carries the first indication information; or a Type field of the NoBypass SID TLV carries second indication information, an Endpoint Behavior field of the NoBypass SID TLV carries the first indication information, and the second indication information is used to indicate that the Endpoint Behavior field carries the first indication information.

In an embodiment, the method further includes: The second network device sends a second advertisement packet to the first network device. The second advertisement packet includes the routing information advertised by the second network device.

In an embodiment, the first advertisement packet and the second advertisement packet each further include a device identifier of the second network device.

In an embodiment, the device identifier of the second network device is router ID or system ID.

In an embodiment, the first advertisement packet further includes the routing information advertised by the second network device.

In an embodiment, the first advertisement packet is an OSPF packet or an ISIS packet.

According to a third aspect, a packet sending method is provided. A second network device receives a packet from a first network device, where the packet includes first indication information, the first indication information is used to indicate the second network device to avoid using a backup forwarding path to send the packet to a destination device of the packet, and the backup forwarding path is a path from the second network device to the destination device; and the second network device determines that a primary forwarding path from the second network device to the destination device is unreachable, and in response to determining that the primary forwarding path is unreachable, the second network device avoids, based on an indication of the second indication information, using the backup forwarding path to send the first packet to the destination device. This avoids a problem of network congestion or system resource waste caused by a loop that occurs when a packet is forwarded by using a backup forwarding path.

In an embodiment, the backup forwarding path passes through the first network device. This avoids a loop between the second network device and the first network device.

In an embodiment, a segment identifier of the second network device is a NoBypass SID.

According to a fourth aspect, a network device is provided, and is applied to a network system including a plurality of network devices. The plurality of network devices include a first network device and a second network device, the network device is the first network device, and the network device includes: an obtaining unit, configured to obtain routing information advertised by the second network device; and a processing unit, configured to: determine that the routing information advertised by the second network device matches a summary route stored in the first network device, and generate, based on a segment identifier of the second network device, a forwarding entry corresponding to the summary route. The forwarding entry includes the segment identifier of the second network device, and a forwarding path corresponding to the forwarding entry passes through the second network device.

In an embodiment, the network device further includes: a receiving unit, configured to: before the forwarding entry corresponding to the summary route is generated based on the segment identifier of the second network device, receive a first advertisement packet. The first advertisement packet includes the segment identifier of the second network device.

In an embodiment, the first advertisement packet further includes first indication information. The processing unit is configured to: match, based on the first indication information, the routing information advertised by the second network device against the summary route stored in the first network device; and when it is determined that the routing information advertised by the second network device matches the summary route stored in the first network device, generate, based on the segment identifier of the second network device, the forwarding entry corresponding to the summary route.

In an embodiment, the first advertisement packet includes the routing information advertised by the second network device. The obtaining unit is configured to obtain, from the first advertisement packet, the routing information advertised by the second network device.

In an embodiment, the first advertisement packet further includes a device identifier of the second network device. The obtaining unit is configured to obtain, based on the device identifier of the second network device and a correspondence, the routing information advertised by the second network device. The correspondence is a correspondence between the device identifier of the second network device and the routing information advertised by the second network device.

In an embodiment, the receiving unit is further configured to: receive a second advertisement packet, where the second advertisement packet includes the device identifier of the second network device and the routing information advertised by the second network device; and generate the correspondence based on the device identifier of the second network device and the routing information advertised by the second network device.

In an embodiment, the first advertisement packet includes an SRv6 END SID TLV, and the first indication information is carried in a flags field, an endpoint behavior field, or a reserved field in the SRv6 END SID TLV.

In an embodiment, the first advertisement packet includes a non-bypass segment identifier type length value NoBypass SID TLV. A type field of the NoBypass SID TLV carries the first indication information; or a Type field of the NoBypass SID TLV carries second indication information, an endpoint behavior field of the NoBypass SID TLV carries the first indication information, and the second indication information is used to indicate that the Endpoint Behavior field carries the first indication information.

In an embodiment, the first advertisement packet is an OSPF packet or an ISIS packet.

In an embodiment, the device identifier of the second network device is router ID or system ID.

In an embodiment, the forwarding entry is a backup forwarding entry corresponding to the summary route, a primary forwarding entry corresponding to the summary route does not pass through the second network device. The processing unit is further configured to set the primary forwarding entry to an unavailable state.

In an embodiment, that the processing unit determines that the routing information advertised by the second network device matches the summary route stored in the first network device includes: The processing unit determines that a prefix in the routing information advertised by the second network device is the same as a prefix of the summary route and that a mask in the routing information advertised by the second network device is the same as a mask of the summary route.

In an embodiment, the network device further includes a sending unit configured to forward a packet based on the forwarding entry. The packet includes second indication information, and the second indication information is used to indicate the second network device to avoid using a backup forwarding path from the second network device to a destination device to forward the packet.

According to a fifth aspect, a network device is provided, and applied to a network system including a plurality of network devices. The plurality of network devices include a first network device and a second network device, the network device is the second network device, and the network device includes: a processing unit, configured to generate a first advertisement packet, where the first advertisement packet includes a segment identifier of the second network device; and a sending unit, configured to: send the first advertisement packet to the first network device. The first advertisement packet is used to indicate the first network device to generate, when it is determined that routing information advertised by the second network device matches a summary route stored in the first network device, a forwarding entry corresponding to the summary route; the forwarding entry includes a segment identifier of the second network device; and a forwarding path corresponding to the forwarding entry passes through the second network device.

In an embodiment, the first advertisement packet further includes first indication information, and the first indication information is used to indicate the first network device to generate, when it is determined that the routing information advertised by the second network device matches the summary route stored in the first network device, the forwarding entry corresponding to the summary route.

In an embodiment, the first advertisement packet includes an SRv6 END SID TLV, and the first indication information is carried in a flags field, an endpoint behavior field, or a reserved field in the SRv6 END SID TLV.

In an embodiment, the first advertisement packet includes a non-bypass segment identifier type length value NoBypass SID TLV. A type field of the NoBypass SID TLV field carries the first indication information; or a Type field of the NoBypass SID TLV carries second indication information, an endpoint behavior field of the NoBypass SID TLV carries the first indication information, and the second indication information is used to indicate that the Endpoint Behavior field carries the first indication information.

In an embodiment, the sending unit is further configured to send a second advertisement packet to the first network device. The second advertisement packet includes the routing information advertised by the second network device.

In an embodiment, the first advertisement packet and the second advertisement packet each further include a device identifier of the second network device.

In an embodiment, the device identifier of the second network device is router ID or system ID.

In an embodiment, the first advertisement packet further includes the routing information advertised by the second network device.

In an embodiment, the first advertisement packet is an open shortest path first OSPF packet or an intermediate system to intermediate system ISIS packet.

According to a sixth aspect, a network device is provided, and is applied to a network system including a plurality of network devices. The plurality of network devices include a first network device and a second network device, the network device is the second network device, and the network device includes: a receiving unit, configured to a packet from the first network device, where the packet includes first indication information, the first indication information is used to indicate the second network device to avoid using a backup forwarding path to send the packet to a destination device of the packet, and the backup forwarding path is a path from the second network device to the destination device; and a processing unit, configured to: determine that a primary forwarding path from the second network device to the destination device is unreachable, and in response to determining that the primary forwarding path is unreachable, avoid, based on an indication of the second indication information, using the backup forwarding path to send the first packet to the destination device.

In an embodiment, the backup forwarding path passes through the first network device.

In an embodiment, a segment identifier of the second network device is a NoBypass SID.

According to a seventh aspect, a packet processing system is provided. The system includes the first network device and the second network device according to the foregoing aspects.

According to an eighth aspect, a computer-readable storage medium is provided, including instructions, a program, or code. When the instructions, the program, or the code is executed on a computer, the computer is enabled to perform the methods according to the foregoing aspects.

According to a ninth aspect, a computer program product including computer instructions is provided. When the computer program product is run on a network device, the network device is enabled to perform the method according to any one of the first aspect, the second aspect, the third aspect, and the possible implementations of the foregoing three aspects.

According to a tenth aspect, a chip is provided, including a memory and a processor. The memory is configured to store instructions or program code. The processor is configured to invoke the instructions or the program code from the memory and run the instructions or the program code, to perform the method according to any one of the first aspect and the possible designs of the first aspect; or the processor performs the method according to any one of the second aspect and the possible designs of the second aspect; or the processor performs the method according to any one of the third aspect and the possible designs of the third aspect.

In an embodiment, the chip includes only a processor. The processor is configured to read and execute the instructions or the program code stored in the memory. When the instructions or the program code is executed, the processor performs the method according to any one of the first aspect and the possible designs of the first aspect; or the processor performs the method according to any one of the second aspect and the possible designs of the second aspect; or the processor performs the method according to any one of the third aspect and the possible designs of the third aspect.

BRIEF DESCRIPTION OF DRAWINGS

FIG. 10A to FIG. 10E are a flowchart of a forwarding entry generation and packet sending method in a network architecture shown in FIG. 11(a) and FIG. 11(b) according to an embodiment of this application;

FIG. 12A to FIG. 12E are a flowchart of another forwarding entry generation and packet sending method in the network architecture shown in FIG. 11(a) and FIG. 11(b) according to an embodiment of this application;

FIG. 14A to FIG. 14C are a flowchart of a forwarding entry generation and packet sending method in the network architecture shown in FIG. 13 according to an embodiment of this application;

DESCRIPTION OF EMBODIMENTS

Figure 1:
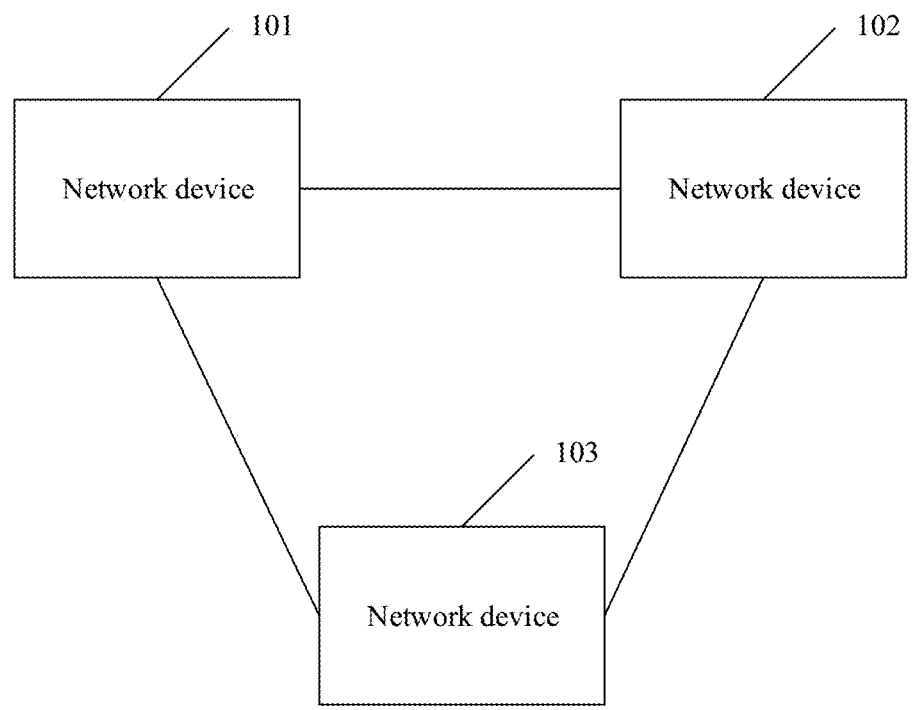
FIG. 1 is a schematic diagram of a network architecture in the conventional technology.

Before the specific technical solutions are described, key terms in embodiments of this application are first described.

A specific route is a route that identifies an IP address of a network device or an address of a network segment to which this network device belongs. Specifically, the specific route includes the IP address and a mask of the network device or the address and a mask of the network segment to which the IP address belongs. For example, if an IP address of a network device is A2:2::2/128, a specific route corresponding to this IP address may be a route corresponding to A2:2::2/128 or a route corresponding to A2:2::/96. The address A2:2::/96 is an address of a network segment to which the address A2:2::2/128 belongs.

A summary route is a route obtained by summarizing a plurality of specific routes that can be aggregated. For example, a network device stores a specific route A1:8::/96 corresponding to a destination address A1:8::/96 and a specific route A1:9::/96 corresponding to a destination address A1:9::/96, and the network device may summarize the two routes to obtain a summary route corresponding to A1::/16 (for ease of description, which is referred to as a summary route A1::/16). Then, the network device may advertise only the summary route to other network devices, thereby saving storage resources of the other network devices.

The following describes embodiments of this application with reference to the accompanying drawings.

Conventionally, a technical problem of network resource waste or network congestion may occur during packet forwarding. The following describes the technical problem in detail by using an example in which a loop occurs during packet forwarding to cause network resource waste or network congestion.

On a medium/large-sized network, a network device requires a large number of memory resources to store a large routing table, and transmitting and processing a large amount of routing information consumes a large number of network resources. To resolve this problem, an interior gateway protocol (IGP) and a border gateway protocol (BGP) provide a route summarization function.

Route summarization is also referred to as route aggregation, indicating that a network device summarizes a plurality of different subnet routes that belong to a same network segment into one summary route. The network device advertises the summary route to a neighboring network device of the network device, and does not advertise the plurality of different subnet routes corresponding to the summary route. This reduces a quantity of forwarding entries in a routing table of the neighboring network device and occupation of system resources. In addition, if a subnet route of the summarized subnet routes in the network segment is frequently deleted and added, the network device does not need to notify the neighboring network device of the subnet route. This is because the subnet route is notified to the neighboring network device in a form of the summary route, so that route flapping in a network is avoided, and network stability is improved to some extent.

Although the use of a summary route can reduce a quantity of forwarding entries stored in a network device, a loop problem exists in some link fault scenarios.

Figure 2:
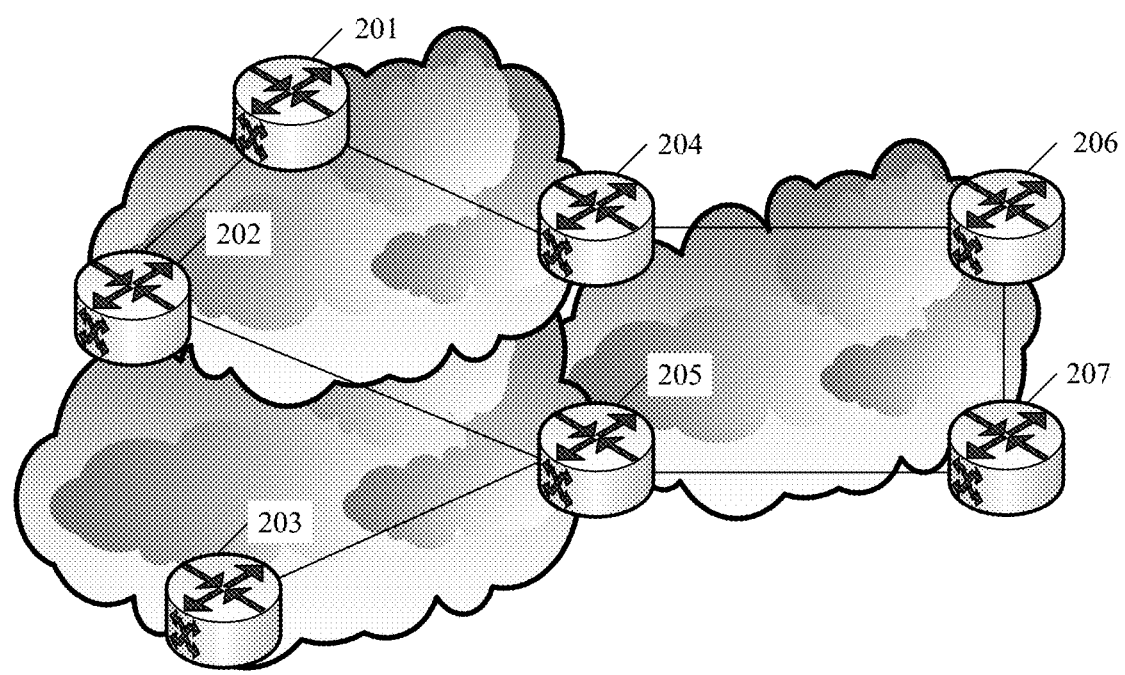
FIG. 2 is a schematic diagram of a network architecture applied to an SRv6 scenario according to an embodiment of this application.

FIG. 2 is a schematic diagram of a network architecture using an SRv6 technology.

In FIG. 2, the network architecture includes an access device, an aggregation device, and a regional core device. The access device may be an access node (ACC), the aggregation device may be an aggregation node (AGG), and the regional core device may be a regional core node (RC).

The access device includes an ACC 201, an ACC 202, and an ACC 203, the aggregation device includes an AGG 204 and an AGG 205, and the regional core device includes an RC 206 and an RC 207. Their connection relationships are: The ACC 201 is connected to the ACC 202 and the AGG 204, the ACC 202 is further connected to the AGG 205, the ACC 203 is connected to the AGG 205, the AGG 204 is connected to the RC 206, the AGG 205 is connected to the RC 207, and the RC 206 is further connected to the RC 207.

Addresses of the foregoing devices in the network architecture may be IPv6 addresses. In the network architecture in FIG. 2, an IP address (namely, an IPv6 address) of the ACC 201 is A1:8::/96, an IP address of the ACC 202 is A1:9::/96, and an IP address of the ACC 203 is A1:A::/96.

The ACC 201, the ACC 202, the AGG 204, and the AGG 205 belong to an access ring 1 in an access network, the ACC 203, the AGG 204, and the AGG 205 belong to an access ring 2 in the access network, and the AGG 204, the AGG 205, the RC 206, and the RC 207 belong to an aggregation ring in a backbone network.

The AGG 204 summarizes a specific route A1:8::/96 of the ACC 201 and a specific route A1:9::/96 of the ACC 202 in the access ring 1 into a summary route A1::/16, and advertises the summary route to a network device in the aggregation ring. Simultaneously, the AGG 204 generates the specific route corresponding to the IP address A1:8::/96 of the ACC 201 and the specific route corresponding to the IP address A1:9::/96 of the ACC 202.

The AGG 205 also summarizes the specific route A1:8::/96 of the ACC 201 and the specific route A1:9::/96 of the ACC 202 in the access ring 1 into a summary route A1::/16, and advertises the summary route to a network device in the aggregation ring. The AGG 205 generates the specific route corresponding to the IP address A1:8::/96 of the ACC 201 and the specific route corresponding to the IP address A1:9::/96 of the ACC 202.

The AGG 204 generates a forwarding table. The forwarding table includes a forwarding entry 1 and a forwarding entry 2 that are shown in Table 1. The forwarding entry 1 is the specific route corresponding to the IP address A1:8::/96, and the forwarding entry 2 is the specific route corresponding to the IP address A1:9::/96. The forwarding entry 1 includes the IP address A1:8::/96 of the ACC 201 and an outbound interface (indicating an identifier of this interface, which is similar below). The outbound interface is an interface of the AGG 204 on a forwarding path from the AGG 204 to the ACC 201. The forwarding entry 2 includes the IP address A1:9::/96 of the ACC 202 and an outbound interface. The outbound interface is an interface of the AGG 204 on a forwarding path from the AGG 204 to the ACC 202. In an embodiment, the outbound interface in the forwarding entry 1 is an outbound interface corresponding to a shortest path from the AGG 204 to the ACC 201, and the outbound interface of the forwarding entry 2 is an outbound interface corresponding to a shortest path from the AGG 204 to the ACC 202. The outbound interface may be an interface corresponding to a direct link between the AGG 204 and the ACC 201.

TABLE 1

| Identifier of a forwarding entry | Destination address | Outbound interface |
| --- | --- | --- |
| 1 | A1:8::/96 | Outbound interface of a direct link to the ACC 201 |
| 2 | A1:9::/96 | Outbound interface of a direct link to the ACC 201 |

In addition, the AGG 204 receives the summary route A1::/16 that is from the RC 206 and that is advertised by the AGG 205, and generates a corresponding forwarding entry 3. Refer to Table 2. The forwarding entry 3 includes the summary route A1::/16 and an outbound interface. The outbound interface is an outbound interface of the AGG 204 on a direct link between the AGG 204 and the RC 206. A forwarding path AGG 204→RC 206→RC 207→AGG 205 may serve as a topology-independent loop-free alternate (Topology-Independent Loop-free Alternate, TI-LFA) path.

TABLE 2

| Identifier of a forwarding entry | Destination address | Outbound interface |
| --- | --- | --- |
| 3 | A1::/16 | Outbound interface of a direct link to the RC 206 |

Refer to Table 3. The table is a forwarding entry generated by the AGG 205, and Table 3 includes a forwarding entry 4 and a forwarding entry 5. The forwarding entry 4 includes the IP address A1:9::/96 of the ACC 202 and an outbound interface. The outbound interface is an interface of the AGG 205 on a direct link between the AGG 205 and the ACC 202. The forwarding entry 5 includes the IP address A1:A::/96 of the ACC 203 and an outbound interface. The outbound interface is an interface of the AGG 205 on a direct link between the AGG 205 and the ACC 203.

TABLE 3

| Identifier of a forwarding entry | Destination address | Outbound interface |
| --- | --- | --- |
| 4 | A1:9::/96 | Outbound interface of a direct link to the ACC 202 |
| 5 | A1:A::/96 | Outbound interface of a direct link to the ACC 203 |

In addition, the AGG 205 receives a summary route A1::/16 that is from the RC 207 and that is advertised by the AGG 204, and generates a corresponding forwarding entry 6. Refer to Table 4. The forwarding entry 6 includes the summary route A1::/16, and an outbound interface of the summary route is an outbound interface of the AGG 205 on a direct link between the AGG 205 and the RC 207.

TABLE 4

| Identifier of a forwarding entry | Destination address | Outbound interface of a next-hop network device |
| --- | --- | --- |
| 6 | A1::/16 | Outbound interface of a direct link to the RC 207 |

When a link AGG 204→ACC 201→ACC 202 is normal, the RC 206 sends a packet to the ACC 202. When the packet arrives at the AGG 204, the AGG 204 searches Table 1 to find a routing entry 2 of the specific route corresponding to the IP address A1:9::/96 of the ACC 202, and then sends the packet to the ACC 201 through the outbound interface that is determined based on the routing entry 2 and that is on the direct link to the ACC 201. Next, the ACC 201 forwards the packet to the ACC 202.

When the direct link between the AGG 204 and the ACC 201 is faulty, the AGG 204 may delete the specific route to the ACC 201 and the specific route to the ACC 202, that is, the AGG 204 deletes the forwarding entry 1 and the forwarding entry 2. After the AGG 204 receives the packet from the RC 206, the AGG 204 fails to obtain, through matching based on a destination address of the packet, namely, the IP address of the ACC 202, the forwarding entry 2 corresponding to the specific route to the ACC 202, but obtains the forwarding entry 3 corresponding to the summary route A1::/16 through matching. Therefore, the AGG 204 may send the packet to the RC 206 based on the outbound interface that is of the direct link to the RC 206 and that is determined by the forwarding entry 3. However, because the RC 206 obtains the summary route A1::/16 through matching based on the destination address of the packet, and a next-hop network device of the summary route is still the AGG 204 (determined based on the shortest path), the RC 206 returns the packet to the AGG 204. Therefore, for the packet, a loop occurs between the AGG 204 and the RC 206, resulting in resource waste and even network congestion.

Similarly, it is assumed that a direct link still exists between the AGG 204 and the AGG 205. If the link between the AGG 204 and the ACC 201 is faulty, and the direct link between the AGG 204 and the AGG 205 is also faulty, for a packet, a loop also occurs between the AGG 204 and the RC 206, resulting in resource waste.

To overcome the technical problem, an embodiment of this application provides a forwarding entry generation method, to reduce a technical problem of resource waste or network congestion in a network communication process. Before the forwarding entry generation method is described, a network architecture to which the method is applicable is first described.

Figure 3:
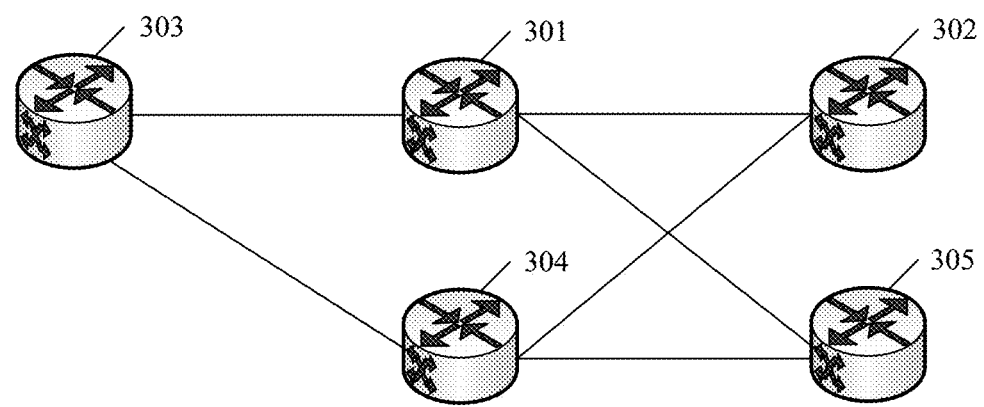
FIG. 3 is a schematic diagram of a structure of a network architecture 300 according to an embodiment of this application.

FIG. 3 is a schematic diagram of a structure of a network architecture 300 according to an embodiment of this application.

In FIG. 3, the network architecture 300 includes a network device 301, a network device 302, a network device 303, a network device 304, and a network device 305. The network device 301 is connected to the network device 302, the network device 303, and the network device 305. The network device 304 is connected to the network device 302, the network device 303, and the network device 305.

In an embodiment of this application, the network device 301, the network device 302, the network device 303, the network device 304, and the network device 305 may be a router (router), a switch (switch), or the like. This is not limited in this embodiment of this application.

The following describes a forwarding entry generation method according to this embodiment of this application with reference to FIG. 3. In the method, the network device 304 advertises routing information of the network device 304 to the network device 302 and the network device 305. After receiving the routing information of the network device 304, both the network device 302 and the network device 305 send the routing information of the network device 304 to the network device 301.

After receiving the routing information of the network device 304, the network device 301 determines whether the routing information of the network device 304 matches a summary route stored in the network device 301. If the routing information of the network device 304 matches the summary route stored in the network device 301, the network device 301 obtains a segment identifier (SID) of the network device 304, and obtains, based on the segment identifier of the network device 304, a forwarding path that passes through the network device 304. The forwarding path that passes through the network device 304 may include the network device 301, the network device 302, and the network device 304, or may include the network device 301, the network device 305, and the network device 304. This depends on which link of network device 301→network device 302→network device 304 and network device 301→network device 305→network device 304 has a smaller cost value. In addition, the network device 304 generates, based on a link that has a relatively small cost value, a forwarding entry corresponding to the summary route. The forwarding entry includes a segment identifier of the network device 304 and an outbound interface, and the outbound interface is an outbound interface corresponding to the relatively small cost value. For example, if the cost value of the link network device 301→network device 302→network device 304 is smaller, the outbound interface is an outbound interface that is of the network device 301 and that is connected to the network device 302.

After the network device 301 receives a first packet whose destination is the network device 303, the network device 301 obtains, through matching based on a segment identifier of the network device 303 in the first packet, the forwarding entry including the summary route, to obtain the segment identifier of the network device 304 and the outbound interface. The network device 301 adds the segment identifier of the network device 304 to the first packet to obtain a second packet, and forwards the second packet to the network device 304 through the outbound interface. After receiving the second packet, the network device 302 forwards the second packet to the network device 304 based on the segment identifier of the network device 304. This avoids a problem that a loop occurs between the network device 301 and the network device 302, thereby saving network resources and reducing network congestion.

Figure 4:
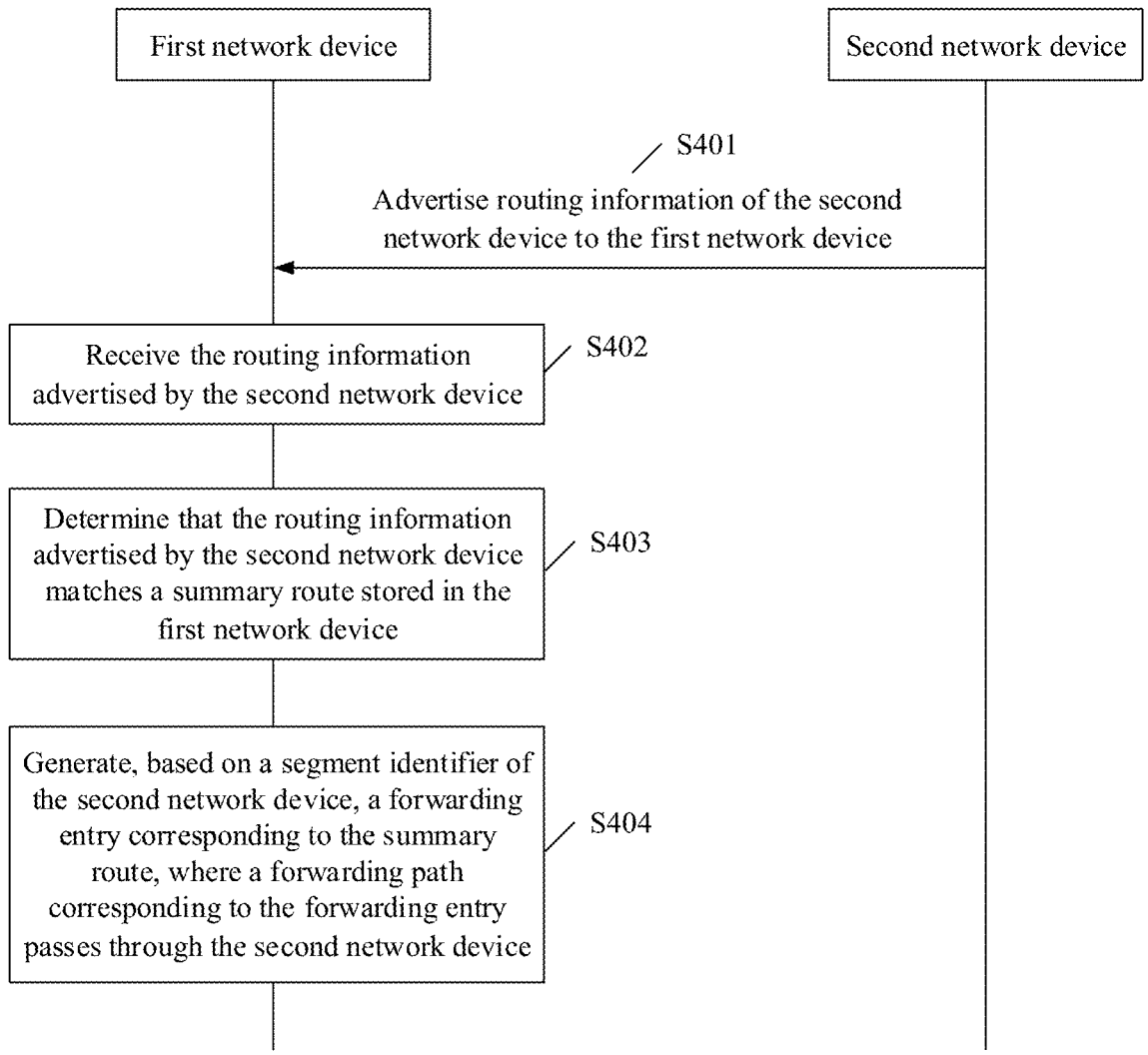
FIG. 4 is a flowchart of a forwarding entry generation method according to an embodiment of this application.

FIG. 4 is a flowchart of a forwarding entry generation method according to an embodiment of this application. The forwarding entry generation method includes the following operations.

S401: A second network device advertises routing information of the second network device to a first network device.

In an embodiment of this application, the first network device may be the network device 301 in FIG. 3, and the second network device may be the network device 304 in FIG. 3.

In an embodiment of this application, the routing information advertised by the second network device may include the summary route of the second network device. The summary route of the second network device may be obtained through configuration, or may be obtained in another manner such as delivery by a controller. This is not limited in this embodiment of this application.

In addition to the summary route of the second network device, the routing information advertised by the second network device may further include a specific route of a third network device. The summary route of the second network device is a route obtained through summarization based on the specific route of the third network device or a specific route of another network device. That is, the second network device communicates with the third network device, and has a capability of forwarding a packet to the third network device. In FIG. 3, the third network device may be the network device 303.

In an embodiment of this application, the second network device and the first network device may be directly or indirectly connected. If the second network device and the first network device are indirectly connected, the routing information advertised by the second network device may be forwarded to the first network device through another network device. For example, in FIG. 3, the routing information of the network device 304 may be forwarded to the network device 301 via the network device 304 or the network device 305.

S402: The first network device receives the routing information advertised by the second network device.

S403: The first network device determines that the routing information advertised by the second network device matches a summary route stored in the first network device.

In an embodiment of this application, the summary route stored in the first network device may be considered as a local summary route, and may be obtained through configuration or may be delivered by the controller. This is not limited in this embodiment of this application.

That the first network device determines whether the routing information advertised by the second network device matches the summary route stored in the first network device may be determining whether a prefix of the summary route of the second network device is the same as a prefix of the summary route stored in the first network device, and determining whether a mask of the summary route of the second network device is the same as a mask of the summary route stored in the first network device. If both determining results are yes, it may be considered that the routing information of the second network device matches the summary route stored in the first network device, that is, the routing information of the second network device is the summary route.

When the routing information advertised by the second network device further includes the specific route of the third network device, the first network device may further determine whether the first network device stores the specific route of the third network device. If yes, it indicates that the first network device can also communicate with the third network device, that is, both the first network device and the second network device can forward the packet to the third network device. When a communications link (the communications link does not pass through the second network device) between the first network device and the third network device is faulty, the first network device may forward, to the second network device, a packet whose destination device is the third network device, and the second network device forwards the packet to the third network device, to implement network reliability. For example, when a direct link between the network device 301 and the network device 303 is faulty, the network device 301 may forward a packet to the network device 304, and the network device 304 forwards the packet to the network device 303. The network device 303 may be considered as the destination device.

S404: The first network device generates, based on the segment identifier of the second network device, a forwarding entry corresponding to the summary route. A forwarding path corresponding to the forwarding entry passes through the second network device.

In an embodiment of this application, when the first network device determines that the routing information advertised by the second network device matches the summary route stored in the first network device, the first network device may obtain the segment identifier of the second network device. The segment identifier of the second network device may be carried in the first advertisement packet sent by the second network device to the first network device. In addition, the first network device may obtain a first forwarding path to the second network device based on the segment identifier of the second network device, and generate, based on the first forwarding path, a forwarding entry corresponding to the summary route. The forwarding entry is used by the first network device to forward a packet to the second network device. The forwarding entry may include the segment identifier of the second network device and an outbound interface. The outbound interface is an interface of the first forwarding path corresponding to the forwarding entry.

For example, the network device 301 may obtain a first forwarding path that passes through the network device 304, and a destination device of the first forwarding path is the network device 303. The first forwarding path is network device 301→network device 302→network device 304→network device 303. In this case, a forwarding entry corresponding to the first forwarding path includes a segment identifier of the network device 304 and an outbound interface, and the outbound interface is an interface connecting the network device 301 to the network device 302.

In an embodiment, the first forwarding path from the first network device to the second network device may be a tunnel, namely, a tunnel to the second network device. The outbound interface in the forwarding entry is an interface corresponding to the tunnel.

It should be noted that specific implementation in which the forwarding entry includes the segment identifier of the second network device may be that the segment identifier of the second network device is directly stored in the forwarding entry, or may be that an identifier is directly stored in the forwarding entry, and the identifier indicates a storage location of the segment identifier of the second network device, for example, a routing entry. The first network device may obtain the segment identifier of the second network device by using the identifier.

In some scenarios, for example, if there are a relatively large quantity of network devices communicating with the first network device, the first network device may receive a relatively large quantity of advertisement packets that carry routing information, but not every advertisement packet that carries the routing information carries a segment identifier of a corresponding network device, that is, not every network device communicating with the first network device needs to generate a corresponding first forwarding path and a corresponding forwarding entry like the second network device. Therefore, to save network resources, in this embodiment of this application, the first advertisement packet may further include first indication information, and the first indication information is used to indicate the first network device to determine that the routing information advertised by the second network device matches the summary route stored in the first network device, and a forwarding entry corresponding to the summary route is generated based on the segment identifier of the second network device. After the first network device receives the first advertisement packet from the second network device, the first network device may match, based on the first indication information, the routing information advertised by the second network device against the summary route stored in the first network device. When it is determined that the routing information advertised by the second network device matches the summary route stored in the first network device, the first network device may generate, based on the segment identifier of the second network device, the forwarding entry corresponding to the summary route. In other words, the first network device needs to generate a corresponding forwarding entry according to the foregoing operations only for an advertisement packet that carries the first indication information, and the first network device does not need to generate a corresponding forwarding entry for an advertisement packet that does not carry the first indication information, so that network resources stored in the first network device can be saved.

In some embodiments, if the first advertisement packet carries the first indication information, the second network device may generate a correspondence between the segment identifier of the second network device and third indication information, the third indication information is used to indicate the second network device to avoid using a backup forwarding path from the second network device to a destination device to forward a second packet. Refer to Table 5. A table header of Table 5 includes a local segment identifier and an action. The local segment identifier is the segment identifier of the second network device. The action is copying a SID of a next-hop network device of a packet to a destination address of the packet (namely, the following second packet), and avoids using the backup forwarding path from the second network device to the destination device to forward the packet. The segment identifier of the second network device may also be referred to as a noBypass SID.

TABLE 5

| Local segment identifier (Local SID) | Action |
| --- | --- |
| Segment identifier of the second network device | Third indication information |

In an embodiment of this application, the first advertisement packet may be an intermediate system to intermediate system (ISIS) packet or an open shortest path first (OSPF) packet.

When the first advertisement packet carries the first indication information, a specific location of the first indication information in the first advertisement packet may have the following two implementations: reusing an existing field of the first advertisement packet to carry the first indication information, or adding a TLV field to the first advertisement packet to carry the first indication information.

If the first implementation is used, that is, the existing field of the first advertisement packet is reused, the first indication information may be carried in a type length value (TLV) field of an existing SRv6 endpoint segment identifier (End SID) in the first advertisement packet.

Figure 5:
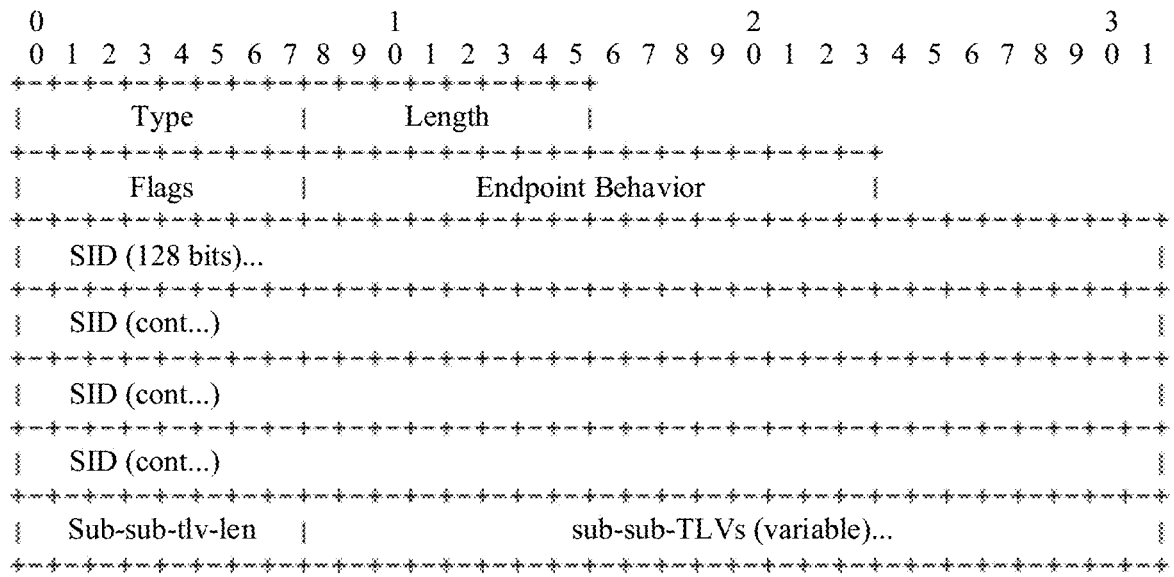
FIG. 5 is a schematic diagram of a format of an End SID TLV field in an ISIS packet according to an embodiment of this application.

FIG. 5 is a schematic diagram of a format of an End SID TLV field in an ISIS packet. In the figure, the End SID TLV field includes a type field, a length field, a flags field, an endpoint behavior field, a SID field, a Sub-sub-tlv-len field, a sub-sub-TLVs field, and the like.

A value of the type field identifies a type of the End SID TLV field. A value of the length field is a length of the End SID TLV. The flags field occupies 8 bits. The End SID TLV field may include one or more SID fields, and each SID field is 128 bits. A value of one SID field may include the SID of the second network device. The SID of the second network device is an IPv6 address of the second network device. A value of the Sub-sub-tlv-len field is a length corresponding to the Sub-sub-tlv field. A Sub-sub-tlv field is optional.

The first indication information may be carried in the flags field or the endpoint behavior field in the ISIS packet.

Figure 6:
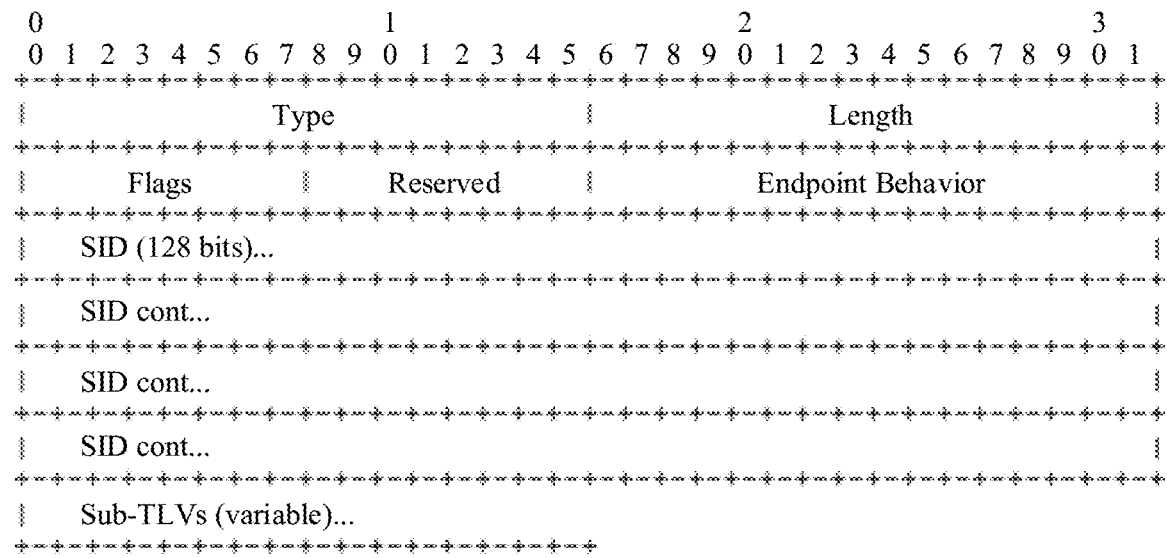
FIG. 6 is a schematic diagram of a format of an End SID TLV field in an OSPF packet according to an embodiment of this application.

FIG. 6 is a schematic diagram of a format of an End SID TLV field in an OSPF packet. In the figure, the End SID TLV field includes a type field, a length field, a flags field, a reserved field, an endpoint behavior field, a SID field, a sub-TLVs field, and the like.

A value of the type field is used to indicate a type of the End SID TLV. A value of the length field is a length of the End SID TLV. The flags field occupies 8 bits. A value of the endpoint behavior field is determined based on a specific situation, and details are not described herein again. The End SID TLV field may include one or more SID fields, and each SID field is 128 bits. A value of one SID field may include the SID of the second network device. The value of the SID field is the IP address of the second network device. The sub-TLVs field is optional.

The first indication information may be carried in the flags field, the reserved field, or the endpoint behavior field in the ISIS packet.

If the second implementation is used, that is, a TLV field is newly added to the first advertisement packet to carry the first indication information, in this embodiment of this application, the newly added TLV field may be referred to as a non-bypass (NoBypass) SID TLV field, and a specific format of this field may be the same as that of the End SID TLV field in FIG. 5 or FIG. 6.

The first indication information may be carried in the type field of the NoBypass SID TLV. Alternatively, the type field of the NoBypass SID TLV includes the second indication information, the endpoint behavior field of the NoBypass SID TLV includes the first indication information, and the second indication information is used to indicate that the endpoint behavior field includes the first indication information. In other words, the first network device may search for a value of the endpoint behavior field based on an indication of the second indication information in the type field of the NoBypass SID TLV, and then perform S403 and S404 based on an indication of the first indication information in the endpoint behavior field.

In addition, the SID field of the NoBypass SID TLV may carry the SID of the second network device.

In an embodiment of this application, based on whether the first advertisement packet further includes the routing information advertised by the second network device and whether the first advertisement packet further includes the first indication information, S401 to S404 may have the following four specific implementations.

Case 1: The first advertisement packet includes the routing information advertised by the second network device and the segment identifier of the second network device, but does not include the first indication information. S401 to S404 may be the following operations.

S501: The second network device sends the first advertisement packet to the first network device.

In an embodiment of this application, before sending the first advertisement packet to the first network device, the second network device may obtain the segment identifier and the routing information of the second network device in advance. The segment identifier and the routing information of the second network device may be obtained through configuration or delivered by a controller.

S502: The first network device receives the first advertisement packet, and obtains the routing information advertised by the second network device and the segment identifier of the second network device from the first advertisement packet.

S503: The first network device determines that the routing information advertised by the second network device matches the summary route stored in the first network device.

S504: The first network device generates, based on the segment identifier of the second network device, a forwarding entry corresponding to the summary route, where a first forwarding path corresponding to the forwarding entry passes through the second network device.

Because the routing information advertised by the second network device and the segment identifier of the second network device are carried in the same advertisement packet, the first network device may consider that the routing information in the first advertisement packet and the segment identifier in the first advertisement packet come from the same network device, namely, the second network device. Therefore, after it is determined that the routing information in the first advertisement packet matches the summary route stored in the first network device, the first network device may generate, based on the segment identifier in the first advertisement packet, the forwarding entry corresponding to the summary route.

Case 2: The first advertisement packet includes the segment identifier of the second network device, but does not include the routing information advertised by the second network device and the first indication information. S401 to S404 may be the following operations.

S601: The second network device sends a second advertisement packet to the first network device, where the second advertisement packet includes the routing information advertised by the second network device.

In an embodiment of this application, the second advertisement packet may be an ISIS packet or an OSPF packet. As mentioned above, the routing information advertised by the second network device may be preconfigured in the second network device, or may be delivered by a controller.

S602: The first network device receives the second advertisement packet, and obtains, from the second advertisement packet, the routing information advertised by the second network device.

S603: The first network device determines that the routing information advertised by the second network device matches the summary route stored in the first network device.

S604: The first network device sends a request message to the second network device, where the request message is used to obtain the segment identifier of the second network device.

S605: The second network device sends the first advertisement packet to the first network device, where the first advertisement packet includes the segment identifier of the second network device.

In an embodiment of this application, before sending the first advertisement packet to the first network device, the second network device may obtain the segment identifier of the second network device in advance. The segment identifier of the second network device may be obtained through configuration or delivered by the controller.

S606: The first network device receives the first advertisement packet, and obtains the segment identifier of the second network device from the first advertisement packet.

S607: The first network device generates, based on the segment identifier of the second network device, a forwarding entry corresponding to the summary route, where a first forwarding path corresponding to the forwarding entry passes through the second network device.

Because the routing information advertised by the second network device and the segment identifier of the second network device are not carried in the same advertisement packet, the first network device first obtains the second advertisement packet; when it is determined, based on the routing information advertised by the second network device, that the second advertisement packet matches the summary route stored in the first network device, sends the request message to the second network device, to obtain the segment identifier of the second network device; and generate the forwarding entry based on the segment identifier of the second network device.

Case 3: The first advertisement packet includes the routing information advertised by the second network device, the segment identifier of the second network device, and the first indication information. S401 to S404 may be the following operations.

S701: The second network device sends the first advertisement packet to the first network device.

S702: The first network device receives the first advertisement packet, and obtains, from the first advertisement packet, the routing information advertised by the second network device, the first indication information, and the segment identifier of the second network device.

In an embodiment of this application, before sending the first advertisement packet to the first network device, the second network device may obtain the segment identifier and the routing information of the second network device in advance. The segment identifier and the routing information of the second network device may be obtained through configuration or delivered by a controller.

S703: The first network device determines, based on the first indication information, that the routing information advertised by the second network device matches the summary route stored in the first network device.

S704: The first network device generates, based on the segment identifier of the second network device, a forwarding entry corresponding to the summary route, where a first forwarding path corresponding to the forwarding entry passes through the second network device.

Because the first advertisement packet includes the first indication information, compared with that in a scenario in Case 1, an effect of reducing network resources stored in the first network device can be achieved.

Case 4: The first advertisement packet includes the segment identifier of the second network device and the first indication information, but does not include the routing information advertised by the second network device. S401 to S404 may be the following operations.

S801: The second network device sends a second advertisement packet to the first network device, where the second advertisement packet includes the routing information advertised by the second network device and a device identifier of the second network device.

In an embodiment of this application, the device identifier of the second network device is used to uniquely identify the second network device. When the second advertisement packet is an ISIS packet, the device identifier of the second network device may be a router identifier (ID). When the second advertisement packet is an OSPF packet, the device identifier of the second network device may be a system ID.

In an embodiment of this application, before sending the first advertisement packet to the first network device, the second network device may obtain the routing information in advance. The routing information may be obtained through configuration or delivered by a controller.

S802: The first network device receives the second advertisement packet, obtains the routing information advertised by the second network device and the device identifier of the second network device from the second advertisement packet, and generates a mapping relationship between the routing information advertised by the second network device and the device identifier of the second network device.

S803: The second network device sends the first advertisement packet to the first network device, where the first advertisement packet includes the device identifier of the second network device, the segment identifier of the second network device, and the first indication information.

In an embodiment of this application, before sending the first advertisement packet to the first network device, the second network device may obtain the segment identifier of the second network device in advance. The segment identifier of the second network device may be obtained through configuration or delivered by the controller.

S804: The first network device receives the first advertisement packet, and obtains the device identifier of the second network device, the first indication information, and the segment identifier of the second network device from the first advertisement packet.

S805: The first network device performs, based on the first indication information, an action of obtaining, based on the device identifier of the second network device and the correspondence, the routing information advertised by the second network device.

S806: The first network device determines that the routing information advertised by the second network device matches the summary route stored in the first network device.

S807: The first network device generates, based on the segment identifier of the second network device, a forwarding entry corresponding to the summary route, where a first forwarding path corresponding to the forwarding entry passes through the second network device.

Because the first advertisement packet includes the first indication information, compared with that in a scenario in Case 2, an effect of reducing network resources of the first network device can be achieved.

It should be noted that, for Case 2 and Case 4, the second network device may first send the second advertisement packet and then send the first advertisement packet to the first network device, or vice versa, that is, first send the first advertisement packet and then send the second advertisement packet. Related operations are similar, and details are not described herein again.

After generating the forwarding entry, the first network device may continue to perform the following packet forwarding method.

S901: The first network device receives a first packet.

In an embodiment of this application, the first packet may be a data packet, namely, a packet carrying service data. The first packet includes an identifier of the destination device. In other words, the first packet needs to reach the destination device. The destination device may be a router, a switch, a terminal device, a server, or the like. This is not limited in this embodiment of this application. In FIG. 3, the destination device may be the network device 303. The identifier of the destination device may be an Internet protocol (Internet Protocol, IP) address of the destination device.

The first packet may be from a fourth network device, and the fourth network device may be, for example, the network device 302 in the embodiment shown in FIG. 3.

In some embodiments, the fourth network device belongs to a first network domain, and the destination device belongs to a second network domain. In this case, the first network device and the second network device may belong to both the first network domain and the second network domain, and the first network device and the second network device may be area border router (ABR) nodes.

For example, the first network domain is an area of a backbone network, the second network domain is an area of an access network, the first network device is a network device connected to the access network and the backbone network, and the first forwarding path is a forwarding path in the backbone network.

For another example, both the first network domain and the second network domain are IGP domains, but IGP domain numbers of the first network domain and the second network domain are different. The first network device is a network device connected to the two IGP domains.

For another example, both the first network domain and the second network domain are BGP domains, but BPG domain numbers of the first network domain and the second network domain are different. The first network device is a network device connected to the two BGP domains.

S902: The first network device obtains, through matching based on the identifier of the destination device, the forwarding entry that includes the summary route, to obtain the segment identifier of the second network device.

In an embodiment of this application, the first forwarding path that passes through the second network device and that is obtained by the first network device may be a primary forwarding path to the destination device, or may be a backup forwarding path. Correspondingly, if the forwarding path is the primary forwarding path, the forwarding entry generated in S404 is a primary forwarding entry. If the forwarding path is the backup forwarding path, the forwarding entry generated in S404 is a backup forwarding entry.

When the forwarding entry generated in S404 serves as the primary forwarding entry and matches the identifier of the destination device, there are two possible implementations. In an embodiment, the first network device generates only one forwarding entry to the destination device, namely, the primary forwarding entry. In this case, the first network device can certainly match the first packet with the unique forwarding entry to the destination device. In another implementation, the first network device generates a primary forwarding entry to the destination device and a backup forwarding entry to the destination device. The primary forwarding entry includes a specific route of the destination device and an outbound interface, and the backup forwarding entry is the forwarding entry generated in S404. When a second forwarding path corresponding to the primary forwarding entry that includes the specific route of the destination device is normal, the first network device may forward the first packet based on the outbound interface of the primary forwarding entry. Usually, the second forwarding path does not pass through the second network device. When the second forwarding path is faulty, the first network device deletes the primary forwarding entry or sets the primary forwarding entry to an unavailable state. In this case, the backup forwarding entry that includes the segment identifier of the second network device becomes a primary forwarding entry. The first network device may match the first packet with the summary route, and forward the first packet based on the forwarding entry corresponding to the summary route.

When the forwarding entry generated in S404, as the backup forwarding entry, matches the identifier of the destination device, it indicates that a primary forwarding entry corresponding to the summary route may exist in the first network device, but the primary forwarding entry does not include the segment identifier of the second network device, and a corresponding second forwarding path also does not pass through the second network device. The primary forwarding entry may be, for example, the forwarding entry 3 in Table 2. When the primary forwarding entry exists, the first network device may set the primary forwarding entry to an unavailable state, so that the first network device can forward the first packet based on the backup forwarding entry, to avoid a loop problem.

Regardless of whether the forwarding entry generated in S404 serves as the primary forwarding entry or the backup forwarding entry, when the first network device matches the first packet with the forwarding entry corresponding to the summary route, the first network device may obtain the segment identifier of the second network device and the outbound interface from the forwarding entry, to perform a subsequent operation.

S903: The first network device adds the segment identifier of the second network device to the first packet, to obtain a second packet.

In an embodiment of this application, an objective of adding the segment identifier of the second network device to the first packet is to enable the obtained second packet to be forwarded to the second network device, so that the second network device continues to send the second packet to the destination device.

In an embodiment, if the second network device does not store a correspondence between the segment identifier of the second network device and third indication information, in this embodiment of this application, in addition to the segment identifier of the second network device, the first network device may further add the third indication information to the first packet. As mentioned above, the third indication information is used to indicate the second network device to avoid using the backup forwarding path from the second network device to the destination device to forward the second packet.

In an embodiment of this application, the third indication information may be carried in a segment router header (SRH) of the second packet.

In a first possible implementation, the third indication information may be carried in a flags field of the SRH of the second packet.

Figure 7:
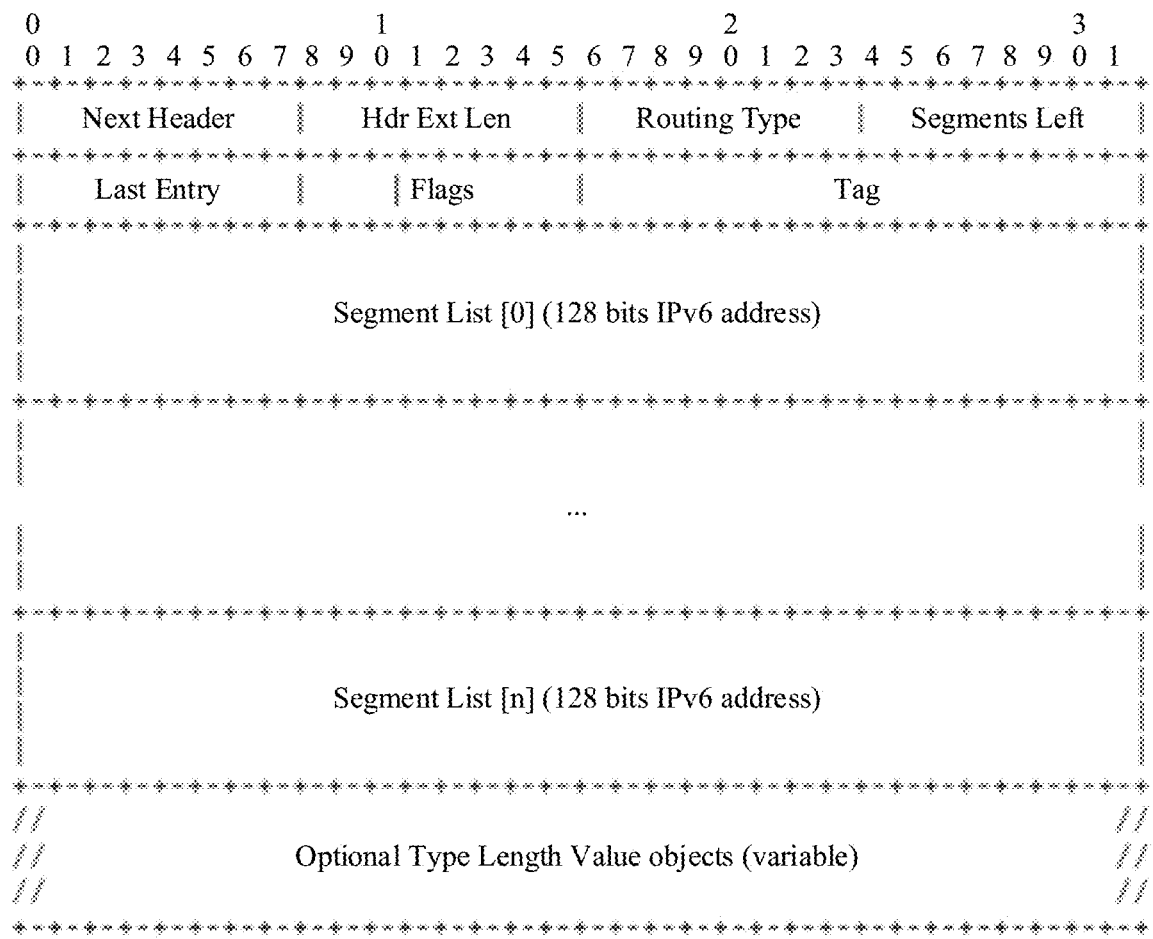
FIG. 7 is a schematic diagram of a format of an SRH of an SRv6 packet according to an embodiment of this application.

For example, refer to FIG. 7 that is a schematic diagram of a format of an SRH of an SRv6 packet. In this figure, the SRH of the SRv6 packet includes a basic header (next header) field, an SRH length (Hdr Ext Len) field, a routing type, a segments left field, a last entry field, a flags field, a tag field, a segment identifier list field, and optional TLV objects.

A value of the next header field is 43, indicating that a next header is a routing extension header. A value of the Hdr Ext Len field is a length of the SRH. A value of the routing type field is 4, indicating that the SRH is carried. A value of the segments left field is the number of a next SID, an initial value is n–1, and n indicates a quantity of SIDs. A value of the last entry field is the number of the last SID on a packet forwarding path. A value of the tag field is used to mark a group of packets having a same feature. A value of the segment list field is a SID list. In this embodiment of this application, one or more bits in the flags field are used to carry the third indication information. For example, a value of an eighth bit in the flags field is 1, identifying the third indication information. When the second network device receives the second packet and determines that the value of the eighth bit in the flags field is 1, the second network device determines that the second network device avoids using a backup path to send the second packet to the destination device. In this embodiment of this application, the bit carrying the third indication information in the flags field may be referred to as NoBypass Flag, and the bit may be marked as B, namely, an abbreviation of NoBypass Flags.

In a second possible implementation, the third indication information may be carried in a SID list field of the SRH of the second packet. In this case, the SID list includes a SID of the second network device, the SID of the second network device includes the third indication information, and the SID of the second network device including the third indication information may also be referred to as a NoBypass SID.

In a SRv6 scenario, the SID of the second network device includes a locator part and a function part, and the SID of the second network device includes an IP address of the second network device. In this scenario, there are two possible implementations.

Figure 8:
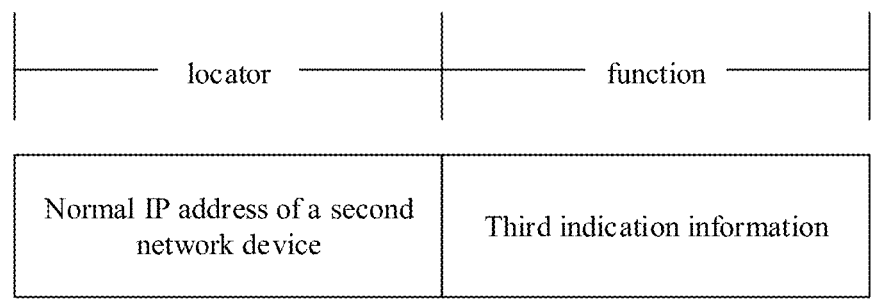
FIG. 8 is a schematic diagram of a format of a NoBypass SID according to an embodiment of this application.

Implementation (a): Refer to FIG. 8. The NoBypass SID may be a special IPv6 address, which may identify the second network device, and may also have an indication function of the third indication information. A value of the function part may be End.X, indicating that after receiving the second packet, a network device that receives the second packet reduces the value of Segments Left by 1, replaces a value of a destination address field in an IPv6 packet header with a value of a SID in a SID list indicated after the reduction by 1, and forwards the second packet to a next-hop network device.

Figure 9:
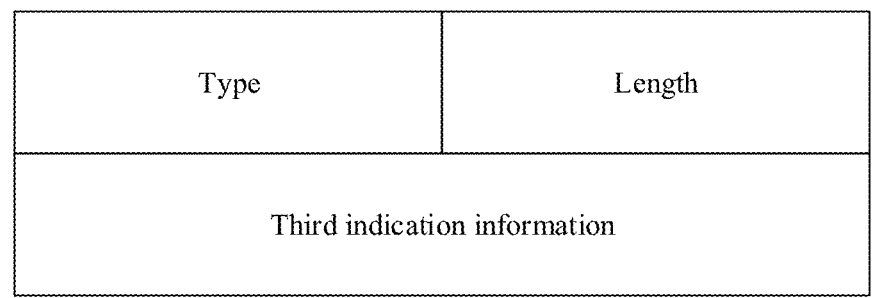
FIG. 9 is a schematic diagram of another format of a NoBypass SID according to an embodiment of this application.
Figure 10B:
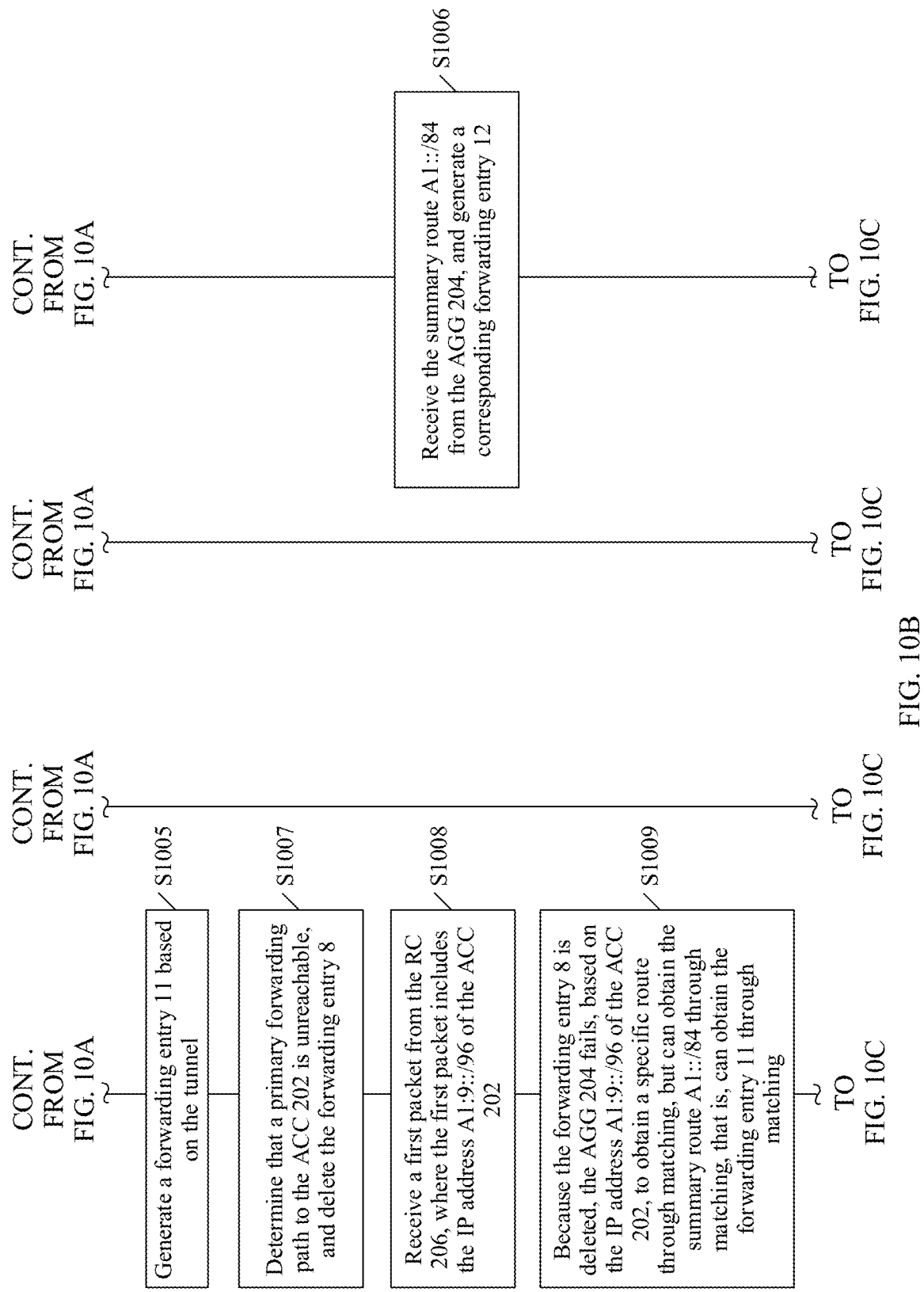
Figure 10E:
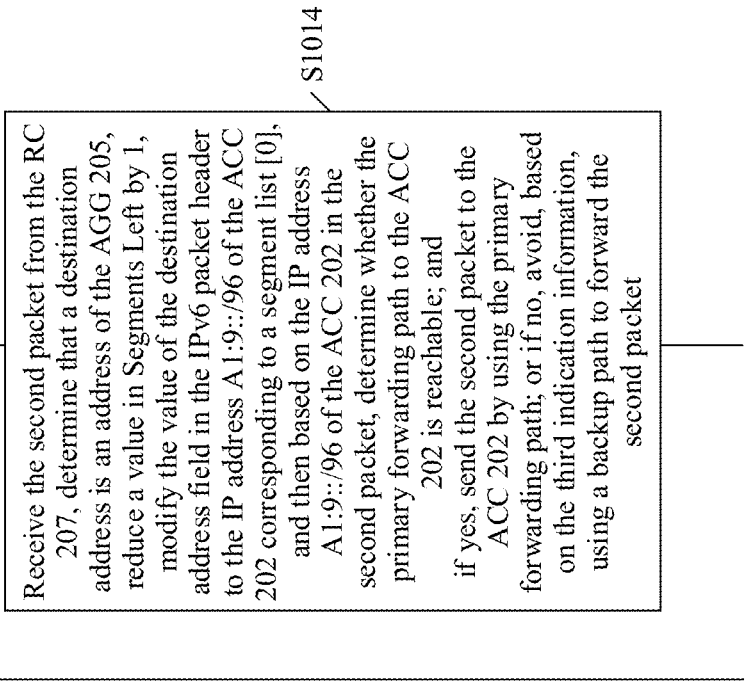

Implementation (b): Refer to FIG. 9. A function part of the NoBypass SID includes the third indication information.

In a third possible implementation, refer to FIG. 10A to FIG. 10E. The third indication information may be carried in a newly added TLV field of the SRH of the second packet. The newly added TLV field includes a type field, a length field, and a value field. A value of the type field is a type of the newly added TLV field, a value of the length field is a length of the TLV field, and a value of the value field is the third indication information.

The foregoing possible implementations do not constitute a limitation on the technical solutions of this application, and persons skilled in the art may design the technical solutions based on an actual case.

The foregoing possible implementations do not constitute a limitation on the technical solutions of this application, and persons skilled in the art may design the technical solutions based on an actual case. In addition, in the SRv6 scenario, in some embodiments, the second packet may not include the segment identifier of the second network device. Alternatively, in the SRv6 scenario, in some embodiments, a SID list of the second packet may further include a SID of a previous-hop network device of the second network device on the first forwarding path, a function part of the SID includes End.X, and End.X is an operation defined in SRv6 Programming, indicating that the previous-hop network device forwards the packet M3 to a layer 3 (layer 3, L3) outbound interface corresponding to the SID.

S904: The first network device sends the second packet to the second network device.

In an embodiment of this application, the first network device sends the second packet to the second network device by using the first forwarding path.

In addition, it is assumed that a network device on the first forwarding path includes a fifth network device, for example, the fifth network device is the network device 305 in FIG. 3, that is, in FIG. 3, the network device 305 and the network device 302 are two independent network devices. In another embodiment, the fifth network device and the fourth network device may be a same network device. When the destination device belongs to the second network domain, the fifth network device may belong to the first network domain, that is, the first forwarding path does not pass through the second network domain. This is intended to save network resources of the second network domain, and is applicable to a case in which network resources of a network device in the first network domain are greater than network resources of a network device in the second network domain.

S905: The second network device receives the second packet and determines that the primary forwarding path from the second network device to the destination device is unreachable.

S906: In response to determining that the primary forwarding path is unreachable, the second network device avoids, based on an indication of the third indication information, using the backup forwarding path to send the second to the destination device.

In an embodiment, when the second network device may store the correspondence between the segment identifier of the second network device and the third indication information, for example, that in Table 5, the second network device may obtain the third indication information based on the segment identifier of the second network device in the second packet and the correspondence, and avoid, based on an indication of the third indication information, using the backup forwarding path to send the second packet to the destination device.

When the second network device does not store the correspondence between the segment identifier of the second network device and the third indication information, the second network device may avoid, based on the indication of the third indication information carried in the second packet, using the backup forwarding path to send the second packet to the destination device.

In an embodiment of this application, there are three possible cases for the primary forwarding path and the backup forwarding path from the second network device to the destination device. The following separately describes S905 and S906 in detail with reference to the three possible cases.

Case 1: The primary forwarding path from the second network device to the destination device is a forwarding path corresponding to a specific route to the destination device, and the backup forwarding path from the second network device to the destination device is a forwarding path corresponding to a summary route to the destination device. In this case, when the second network device does not obtain a corresponding specific route through matching based on an IP address of the destination device, it indicates that the primary forwarding path from the second network device to the destination device is unreachable. Therefore, even if a summary route corresponding to the IP address of the destination device exists, the second packet is not sent by using the backup forwarding path corresponding to the summary route. Alternatively, although the second network device obtains the specific route through matching based on an IP address of the destination device, the forwarding path corresponding to the specific route is unreachable, so that even if the summary route corresponding to the IP address of the destination device exists, the second network device does not use, based on the indication of the third indication information, the backup forwarding path corresponding to the summary route to send the second packet.

Case 2: The primary forwarding path from the second network device to the destination device is a primary forwarding path of a summary route to the destination device, and the backup forwarding path is a backup forwarding path of the summary route to the destination device. When the second network device obtains the summary route through matching based on an IP address of the destination device and determines that the primary forwarding path of the summary route is unreachable, the second network device does not use, based on the indication of the third indication information, the backup forwarding path of the summary route to send the second packet to the destination device.

Case 3: The primary forwarding path from the second network device to the destination device is a primary forwarding path of a specific route to the destination device, and the backup forwarding path is a backup forwarding path of the specific route to the destination device. When the second network device obtains the specific route through matching based on an IP address of the destination device, but the primary forwarding path of the specific route is unreachable, the second network device does not use, based on the indication of the third indication information, the backup forwarding path of specific route to send the second packet.

In an embodiment of this application, when the second network device forwards the second packet to the destination device, if the primary forwarding path is unreachable, the second network device no longer use the backup forwarding path to forward the packet. In this way, a problem of a packet forwarding loop caused by using the backup forwarding path to forward a packet is avoided, and then resource waste or network congestion are avoided. When the backup forwarding path passes through the first network device, a loop problem generated between the second network device and the first network device can be avoided by using the method. The second network device may discard the second packet after avoiding using the backup forwarding path to send the second packet to the destination device.

The following uses several application scenarios as examples to describe in detail a forwarding entry generation method and a packet sending method according to an embodiment of this application.

Scenario 1

Refer to FIG. 10A to FIG. 10E, FIG. 11(*a*), and FIG. 11(*b*). FIG. 10A to FIG. 10E are a flowchart of a forwarding entry generation and packet sending method in a network architecture shown in FIG. 11(*a*) and FIG. 11(*b*), and the network architecture shown in FIG. 11(*a*) and FIG. 11(*b*) is the same as the network architecture shown in FIG. 2.

The forwarding entry generation and packet sending method includes the following operations.

S1001: An AGG 204 generates a forwarding entry 7 of a specific route corresponding to an IP address A1:8::/96 of an ACC 201, and generates a forwarding entry 8 of a specific route corresponding to an IP address A1:9::/96 of an ACC 202. The AGG 204 summarizes the specific route A1:8::/96 of the ACC 201 and the specific route A1:9::/96 of the ACC 202 in an access ring 1 into a summary route A1:116, and advertises the summary route A1:116 to a network device in an aggregation ring.

In an embodiment of this application, the AGG 204 may be considered as the foregoing first network device. Refer to Table 6. The table includes forwarding entries generated by the AGG 204, and the forwarding entries include the forwarding entry 7 and the forwarding entry 8. The forwarding entry 7 includes the IP address A1:8::/96 of the ACC 201 and an outbound interface (indicating an identifier of this interface, which is similar below). The outbound interface is an interface of the AGG 204 on a forwarding path from the AGG 204 to the ACC 201. The forwarding entry 8 includes the IP address A1:9::/96 of the ACC 202 and an outbound interface, and the outbound interface is an interface of the AGG 204 on a forwarding path from the AGG 204 to the ACC 202. The outbound interfaces in both the forwarding entry 7 and the forwarding entry 8 each are an interface of a shortest path between the AGG 204 and the ACC 201, and the interface of the shortest path may be an outbound interface of the AGG 204 on a direct link between the AGG 204 and the ACC 201.

TABLE 6

| Identifier of a forwarding entry | Destination address | Outbound interface |
|---|---|---|
| 7 | A1:8::/96 | Outbound interface of a direct link to the ACC 201 |
| 8 | A1:9::/96 | Outbound interface of a direct link to the ACC 201 |

S1002: An AGG 205 generates a forwarding entry 9 of the specific route corresponding to the IP address A1:9::/96 of the ACC 202 and a forwarding entry 10 of a specific route corresponding to an IP address A1:A::/96 of an ACC 203. The AGG 205 summarizes the specific route A1:9::/96 of the ACC 202 in the access ring 1 and the specific route A1:A::/96 of the ACC 203 in an access ring 2 into a summary route A1::/16, and advertises the summary route A1:116 to the aggregation ring.

In an embodiment of this application, the AGG 205 may be considered as the foregoing second network device.

Refer to Table 7. In the table, there are the forwarding entry 9 and the forwarding entry 10 generated by the AGG 205. The forwarding entry 9 includes the IP address A1:9::/96 of the ACC 202 and an outbound interface. The outbound interface is an outbound interface of the AGG 205 on a direct link between the AGG 205 and the ACC 202. The forwarding entry 10 includes the IP address A1:A::/96 of the ACC 203 and an outbound interface. The outbound interface is an outbound interface of the AGG 205 on a direct link between the AGG 205 and the ACC 203.

TABLE 7

| Identifier of a forwarding entry | Destination address | Outbound interface |
|---|---|---|
| 9 | A1:9::/96 | Outbound interface of a direct link to the ACC 202 |
| 10 | A1:A::/96 | Outbound interface of a direct link to the ACC 203 |

S1003: The AGG 204 receives an advertisement packet from the AGG 205. The advertisement packet includes the summary route A1::/16 and a SID A2:2::2/128 of the AGG 205.

S1004: If the AGG 204 determines that the summary route A1::/16 in the advertisement packet matches a summary route A1::/16 locally stored on the AGG 204, the AGG 204 generates a tunnel to the AGG 205 based on the SID A2:2::2/128 of the AGG 205.

In an embodiment of this application, the tunnel to the AGG 205 sequentially passes through the AGG 204, an RC 206, an RC 207, and the AGG 205, and the tunnel may be considered as the first forwarding path in the foregoing description.

S1005: The AGG 204 generates a forwarding entry 11 based on the tunnel.

Refer to Table 8. A destination address of the forwarding entry 11 is A1::/16, and the forwarding entry 11 further includes forwarding information and an outbound interface of the tunnel. The backup forwarding information includes a repair list (repair list), and the repair list includes the SID of the AGG 205. In an embodiment, the repair list may further include SIDs of other network devices than the SID of the AGG 205 on the tunnel, for example, a SID A2:2::4/128 of the RC 206 and a SID A2:2::3/128 of the RC 207.

TABLE 8

| Identifier of a forwarding entry | Destination address | Repair list (repair list) | Outbound interface |
|---|---|---|---|
| 11 | A1::/16 | A2:2::4/128 A2:2::3/128 A2:2::2/128 | Interface corresponding to a tunnel |

S1006: The AGG 205 receives the summary route A1:116 from the AGG 204, and generates a corresponding forwarding entry 12.

Refer to Table 9. The forwarding entry 9 corresponding to the summary route A1::/16 includes an outbound interface. The outbound interface is an outbound interface of the AGG 205 on a direct link between the AGG 205 and the RC 207.

TABLE 9

| Identifier of a forwarding entry | IP address | Outbound interface |
|---|---|---|
| 12 | A1::/16 | Outbound interface of a direct link to the RC 207 |

S1007: The AGG 204 determines that the primary forwarding path to the ACC 202 is unreachable, and the AGG 204 deletes the forwarding entry 8.

The primary forwarding path from the AGG 204 to the ACC 202 is AGG 204→ACC 201→ACC 202, and the primary forwarding path may be considered as the second forwarding path in the foregoing description. When the primary forwarding path is faulty, the AGG 204 may delete the forwarding entry 8.

S1008: The AGG 204 receives a first packet from the RC 206, where the first packet includes the IP address A1:9::/96 of the ACC 202.

In an embodiment of this application, the ACC 202 may be considered as the foregoing destination device.

In an embodiment, the first packet includes an IPv6 packet header and a payload, the IPv6 packet header includes a destination address, and the destination address is the IP address A1:9::/96 of the ACC 202.

S1009: Because the forwarding entry 8 is deleted, based on the IP address A1:9::/96 of the ACC 202, the AGG 204 fails to obtain a specific route through matching, but can obtain the summary route A1::/16 through matching, that is, can obtain the forwarding entry 11 through matching.

S1010: The AGG 204 adds a SID A1:9::/96 of the ACC 202, the SID A2:2::2/128 of the AGG 205, the SID A2:2::3/128 of the RC 207, and the SID A2:2::4/128 of the RC 206 to a SID list in an SRH of the first packet, adds third indication information to a flags field of the SRH of the first packet, and modifies a value of a destination address field in an IPv6 packet header of the first packet to the SID A2:2::4/128 of the RC 206, to obtain a second packet.

Figure 11A:
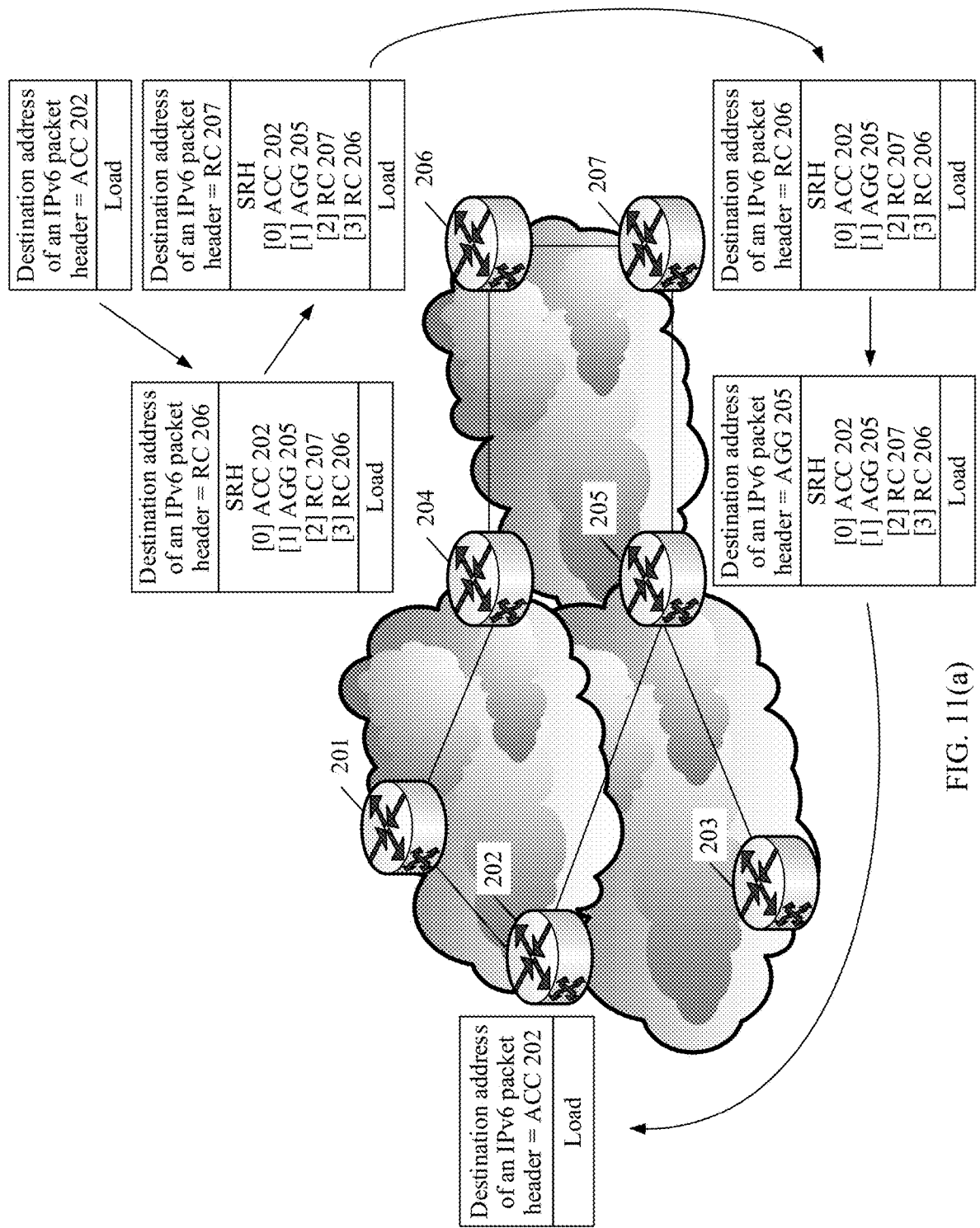
FIG. 11(a) is a schematic diagram of the network architecture in Scenario 1 according to an embodiment of this application.

Refer to FIG. 11(a), in the second packet, the SID of the ACC 202 is stored at a location of a segment list [0] in an SRH header, the SID of the AGG 205 is stored at a location of a segment list [1] in the SRH header, the SID of the RC 207 is stored at a location of a segment list [2] in the SRH header, and the SID of RC 206 is stored at a location of a segment list [3] in the SRH header. Segments Left is set to 3.

For specific implementation of carrying the third indication information in the second packet, refer to the foregoing description. Details are not described herein again.

S1011: The AGG 204 sends the second packet to the RC 206 based on the interface corresponding to the tunnel.

S1012: The RC 206 receives the second packet, determines that a destination address is an address of the RC 206, reduces a value in Segments Left by 1, modifies a value of a destination address field in an IPv6 packet header to the SID A2:2::3/128 of the RC 207 corresponding to the segment list [2], searches, based on the SID A2:2::3/128 of the RC 207, a forwarding entry 13 pre-generated by the RC 206 to obtain an outbound interface, and forwards a modified second packet through the outbound interface.

In an embodiment of this application, the RC 206 pre-generates, based on a shortest path method, the forwarding entry 13 to the RC 207. Refer to Table 10. The forwarding entry includes a destination address and an outbound interface. The destination address is the SID A2:2::3/128 of the RC 207, and the outbound interface is an outbound interface of a direct link to the RC 207.

TABLE 10

| Identifier of a forwarding entry | Destination address | Outbound interface |
|---|---|---|
| 13 | A2:2::3/128 | Outbound interface of a direct link to the RC 207 |

S1013: The RC 207 receives the second packet from the RC 206, determines that a destination address is an address of the RC 207, reduces the value in Segments Left by 1, modifies the value of the destination address field in the IPv6 packet header to the SID A2:2::2/128 of the AGG 205 corresponding to the segment list [1], searches, based on the SID A2:2::2/128 of the AGG 205, a forwarding entry 14 pre-generated by the RC 207 to obtain an outbound interface, and forwards a modified second packet through the outbound interface.

In an embodiment of this application, the RC 206 pre-generates, based on the shortest path method, the forwarding entry 14 destined for the AGG 205. Refer to Table 11. The forwarding entry includes a destination address and an outbound interface. The destination address is the SID A2:2::2/128 of the AGG 205, and the outbound interface is an outbound interface of a direct link to the AGG 205.

TABLE 11

| Identifier of a forwarding entry | Destination address | Outbound interface |
|---|---|---|
| 14 | A2:2::2/128 | Outbound interface of a direct link to the AGG 205 |

S1014: The AGG 205 receives the second packet from the RC 207, determines that a destination address is an address of the AGG 205, reduces the value in Segments Left by 1, modifies the value of the destination address field in the IPv6 packet header to the IP address A1:9::/96 of the ACC 202 corresponding to the segment list [0], and determines, based on the IP address A1:9::/96 of the ACC 202 in the second packet, whether a primary forwarding path to the ACC 202 is reachable. If the primary forwarding path to the ACC 202 is reachable, the AGG 205 sends the second packet to the ACC 202 by using the primary forwarding path. If the primary forwarding path to the ACC 202 is unreachable, the AGG 205 avoids, based on the third indication information, using a backup path to forward the second packet.

In an embodiment, based on the IP address A1:9::/96 of the ACC 202 in the destination address, the AGG 205 determines whether the forwarding entry 9 can be obtained through matching. If the forwarding entry 9 can be obtained through matching, it is considered that the primary forwarding path to the ACC 202 is reachable, and then the second packet is sent to the ACC 202 through the outbound interface of the direct link to the ACC 202. In addition, because the SID of the ACC 202 is a PSP-type End SID, an SRH header of the second packet is popped before the second packet is sent. Before forwarding the packet, the ACC 202 modifies the destination address in the IPv6 packet header to the IP address of the ACC 202. If the matching fails, or the matching succeeds, but it is determined that the direct link to the ACC 202 is unreachable, the AGG 205 obtains the forwarding entry 12 through matching based on the IP address of the ACC 202, and the AGG 205 does not use the entry 12 to forward the packet, but directly discards the second packet. In this way, the RC 207 is prevented from returning the second packet to the AGG 204 via the RC 206, thereby avoiding forming a loop.

In some embodiments, when a type of the SID of the AGG 205 is an ultimate segment pop of the SRH (UPS) type, the AGG 205 does not need to pop the SRH before sending the second packet.

Because the second packet carries the third indication information, the AGG 205 cannot return the second packet to the AGG 204 when the primary forwarding path to the ACC 202 is unreachable, thereby avoiding a problem of resource waste or network congestion.

Figure 11B:
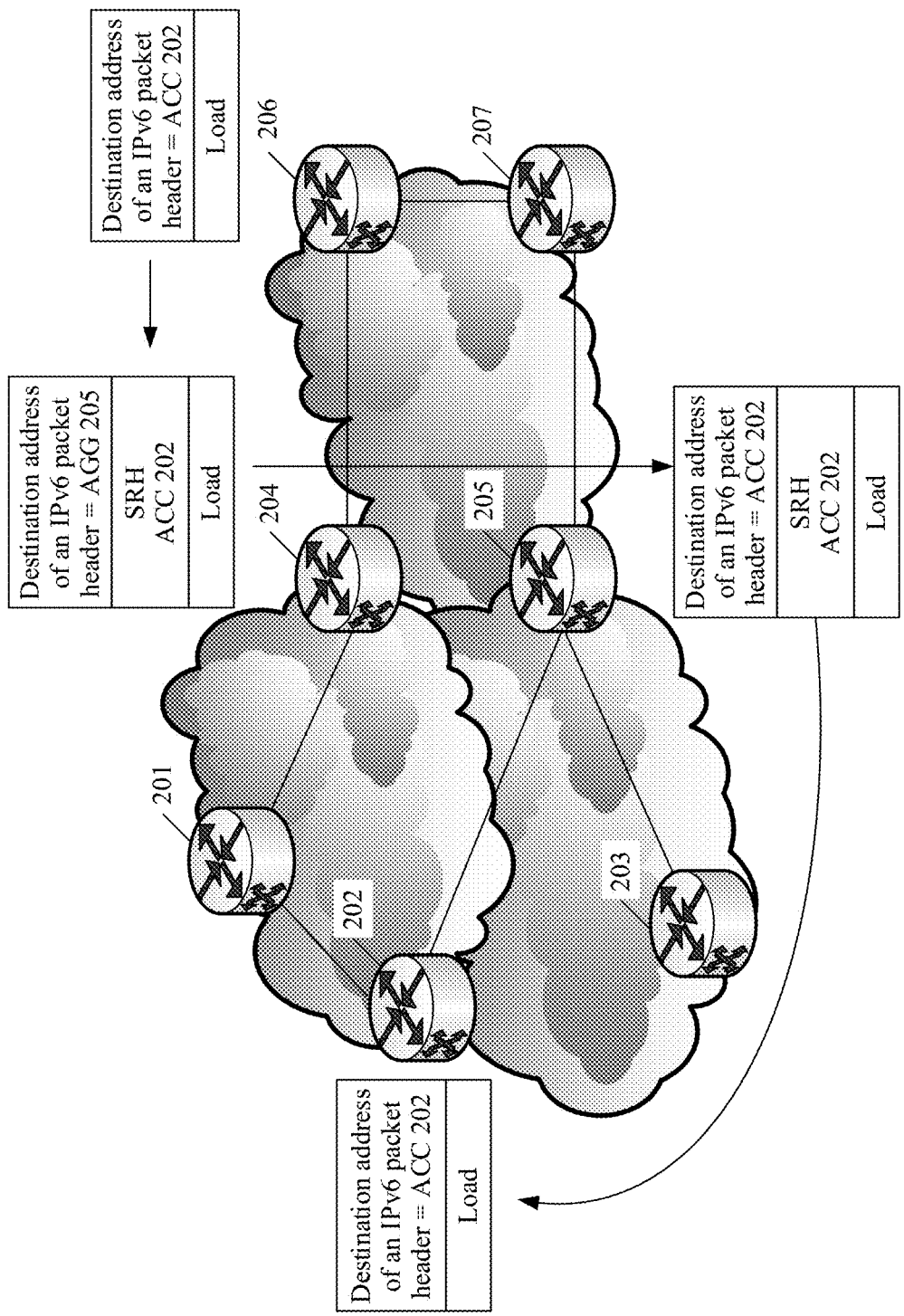
FIG. 11(b) is another schematic diagram of the network architecture in Scenario 1 according to an embodiment of this application.
Figure 12B:
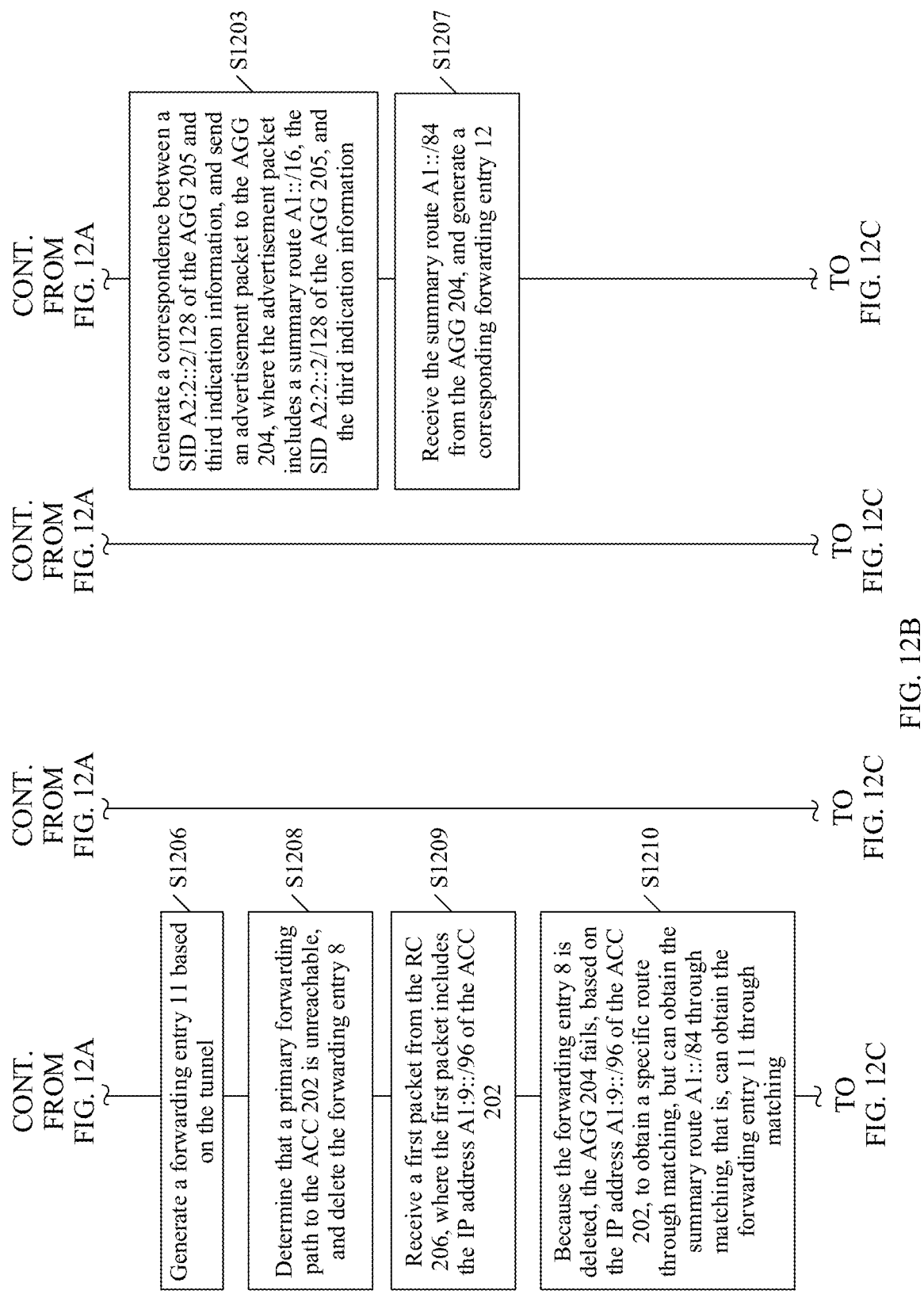
Figure 12D:
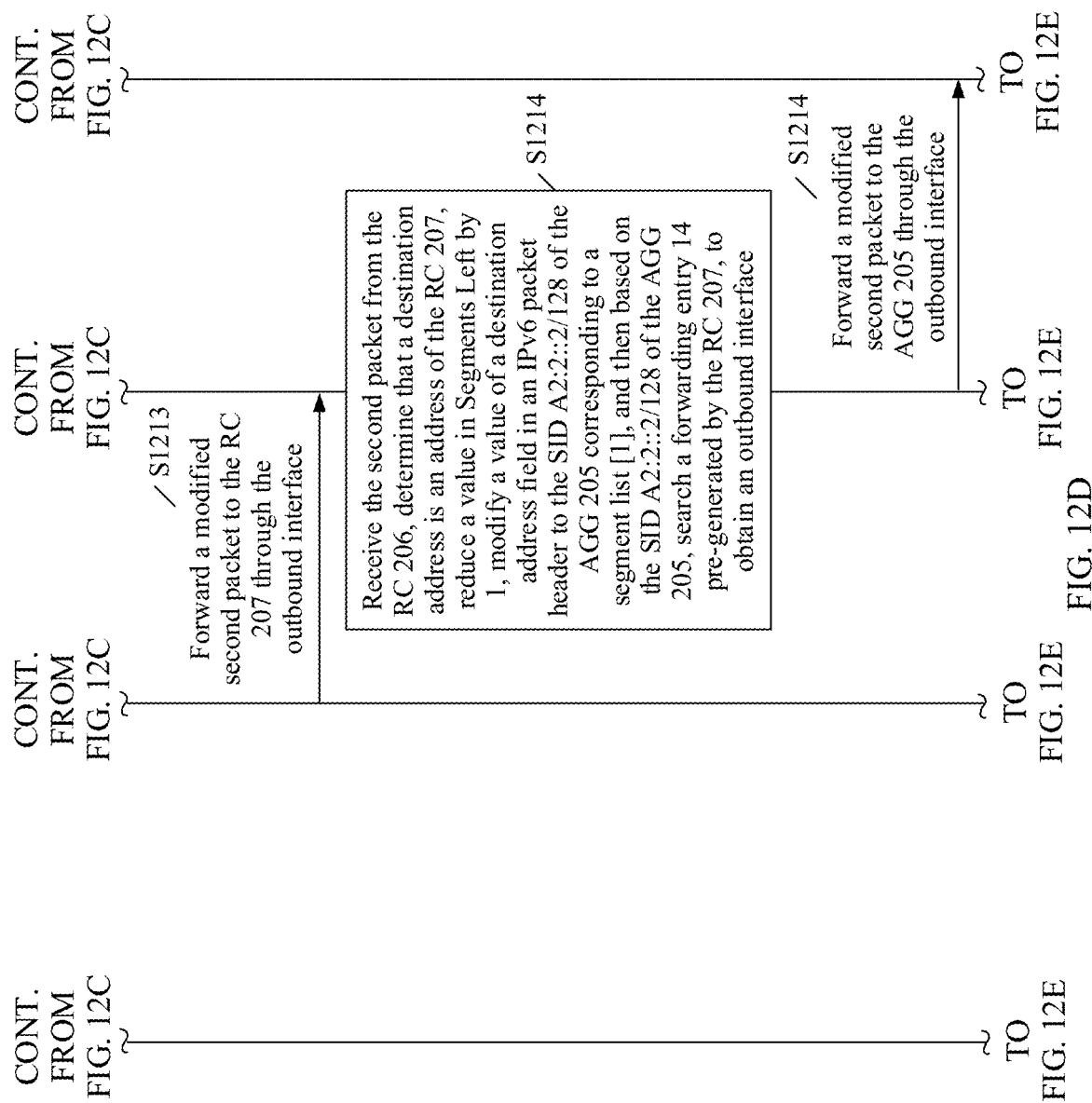

In some embodiments, a case in which a direct link exists between the AGG 204 and the AGG 205 but the direct link is faulty is similar to a case in which no direct link between the AGG 204 and the AGG 205 is faulty, and details are not described herein again. In some embodiments, as shown in FIG. 11(b), the second packet may not include the SID of the AGG 205, the SID of the RC 206, and the SID of the RC 207, so that a length of an SRH is reduced, and network resources occupied during packet forwarding can be reduced.

Scenario 2

Refer to FIG. 12A to FIG. 12E. FIG. 12A to FIG. 12E are a flowchart of a forwarding entry generation and packet sending method in the network architecture shown in FIG. 11(a) and FIG. 11(b), and the network architecture shown in FIG. 11(a) and FIG. 11(b) is the same as the network architecture shown in FIG. 2.

The forwarding entry generation and packet sending method includes the following operations.

S1201 and S1202 are the same as S1001 and S1002, and details are not described herein again.

S1203: The AGG 205 generates a correspondence between a SID A2:2::2/128 of the AGG 205 and third indication information, and sends an advertisement packet to the AGG 204. The advertisement packet includes the summary route A1::/16, the SID A2:2::2/128 of the AGG 205, and the third indication information.

The third indication information is used to indicate the AGG 205 to avoid using a backup forwarding path to forward a packet.

S1204: The AGG 204 receives the advertisement packet from the AGG 205. The advertisement packet includes the summary route A1::/16, the SID A2:2::2/128 of the AGG 205, and first indication information.

The first indication information is used to indicate the AGG 204 to perform S1205 and S1206 in the following.

S1205: If the AGG 204 determines, based on the first indication information, that the summary route A1::/16 in the advertisement packet matches a summary route A1::16 locally stored on the AGG 204, the AGG 204 generates, based on the SID A2:2::2/128 of the AGG 205, a tunnel to the AGG 205.

For a description of tunnel generation, refer to Scenario 1. Details are not described herein again.

S1206 to S1210 are the same as S1005 to S1009, and details are not described herein again.

S1211: The AGG 204 adds a SID A1:9::/96 of the ACC 202 and the SID A2:2::2/128 of the AGG 205 to a SID list in an SRH of a first packet, and modifies a value of a destination address field in an IPv6 packet header of the first packet to an IP address of the AGG 205, to obtain a second packet.

In an embodiment, the second packet may not carry the third indication information.

S1212: The AGG 204 sends the second packet to the RC 206 based on the interface corresponding to the tunnel.

S1213 and S1214 are the same as S1012 and S1013, and details are not described herein again.

S1215: The AGG 205 receives the second packet from the RC 207, determines that a destination address is an address of the AGG 205, reduces the value in Segments Left by 1, modifies the value of the destination address field in the IPv6 packet header to the IP address A1:9::/96 of the ACC 202 corresponding to the segment list [0], and determines, based on the IP address A1:9::/96 of the ACC 202 in the second packet, whether a primary forwarding path to the ACC 202 is reachable. If yes, the AGG 205 sends the second packet to the ACC 202 by using the primary forwarding path; or if no, the AGG 205 obtains the third indication information based on the SID A2:2::21128 of the AGG 205 and a correspondence stored in the AGG 205, and avoid using a backup forwarding path to forward the second packet based on an indication of the third indication information.

The correspondence stored in the AGG 205 is the foregoing correspondence between the SID A2:2::2/128 of the AGG 205 and the third indication information.

Because the AGG 205 can find the third indication information based on the SID A2:2::2/128 of the AGG 205 in the second packet, it can be implemented that the AGG 205 does not forward the second packet by using the backup forwarding path. This avoids a problem of resource waste or network congestion caused when the AGG 205 returns the second packet to the AGG 204 via the RC 207 and the RC 206.

Scenario 3

Figure 13:
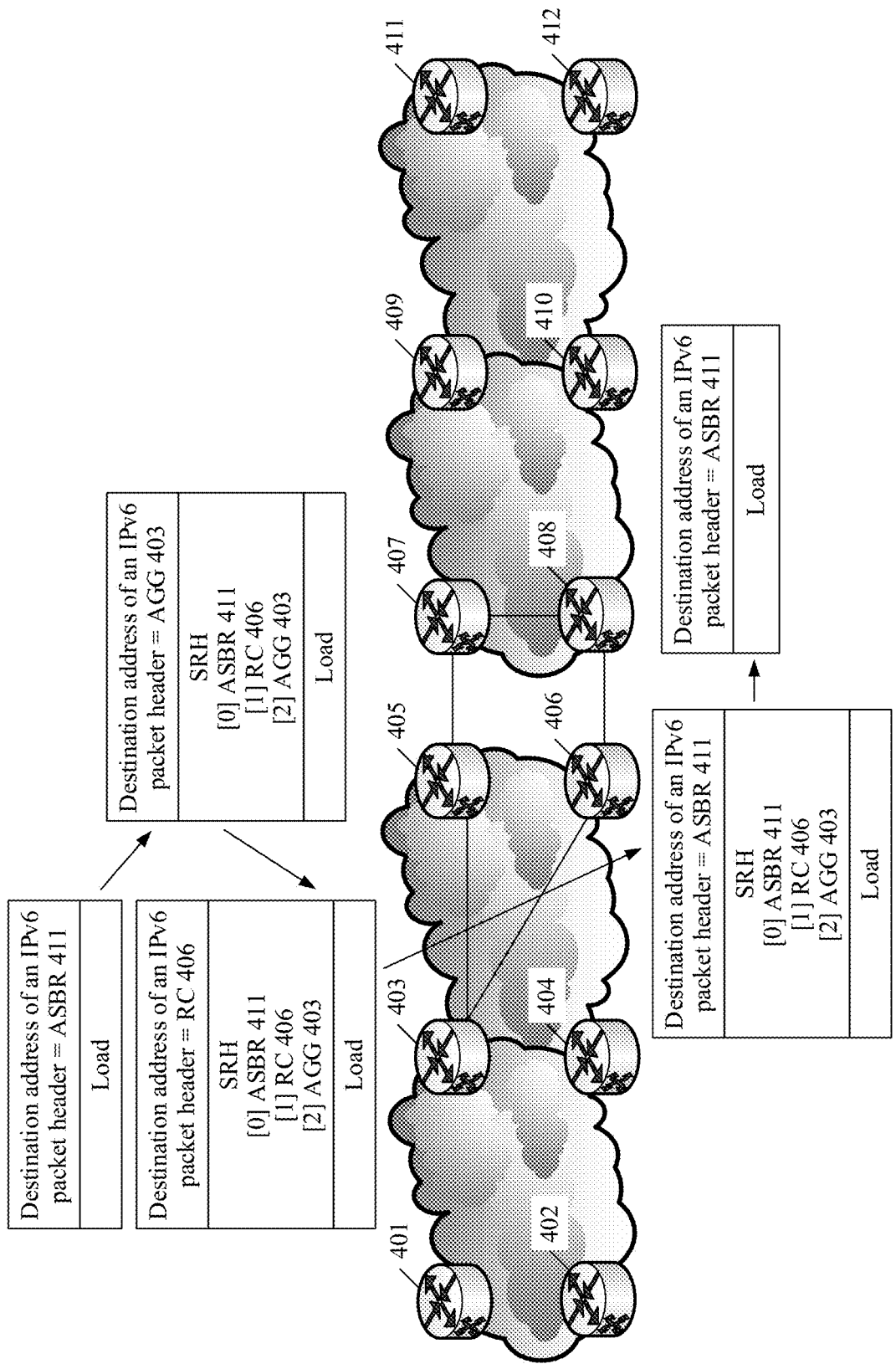
FIG. 13 is a schematic diagram of a cross-domain network architecture according to an embodiment of this application.

FIG. 13 is a schematic diagram of a cross-domain network architecture. In this figure, the network architecture includes an ACC 401, an ACC 402, an AGG 403, an AGG 404, an RC 405, and an RC 406 that are in an IGP domain, and an autonomous system boundary router (Autonomous System Boundary Router, ASBR) 407, an ASBR 408, a provider (Provider, P) device 409, a P device 410, an ASBR 411, and an ASBR 412 that are in an external border gateway protocol (EBGP) domain.

The ACC 401, the ACC 402, the AGG 403, and the AGG 404 belong to an IGP domain 1. The AGG 403, the AGG 404, the RC 405, and the RC 406 belong to an IGP domain 2. The ASBR 407, the ASBR 408, the P device 409, and the P device 410 belong to an EBGP domain 1. The P device 409, the P device 410, the ASBR 411, and the ASBR 412 belong to an EBGP domain 2.

The AGG 403 is connected to the RC 405 and the RC 406, the RC 406 is connected to the ASBR 407, the RC 406 is further connected to the ASBR 408, and the ASBR 408 is further connected to the ASBR 407.

The RC 405 receives routing information of the ASBR 411 from the ASBR 407, and determines that a next-hop network device of a primary forwarding path from the RC 405 to the ASBR 411 is the ASBR 407, and an outbound interface is an interface of a direct link between the RC 405 and the ASBR 407. In addition, the RC 405 may further receive routing information of the ASBR 411 from the RC 406, and determine that a next-hop network device of a backup forwarding path from the RC 405 to the ASBR 411 is the AGG 403, and an outbound interface is an outbound interface of a direct link between the RC 405 and the AGG 403.

After the RC 405 receives a packet whose destination device is the ASBR 411 from the AGG 403, if the primary forwarding path to the ASBR 411 is faulty or the ASBR 407 is faulty, the RC 405 may send the packet to the AGG 403, and the AGG 403 sends the packet to the RC 406, so that the RC 406 can send the packet to the destination device ASBR 411 by using the ASBR 408.

However, if in a conventional manner, in a case of a failure between the RC 406 and the ASBR 408, the RC 406 returns the packet to the RC 405 via the AGG 403, thereby forming a loop, resulting in resource waste and network congestion.

Figure 14C:
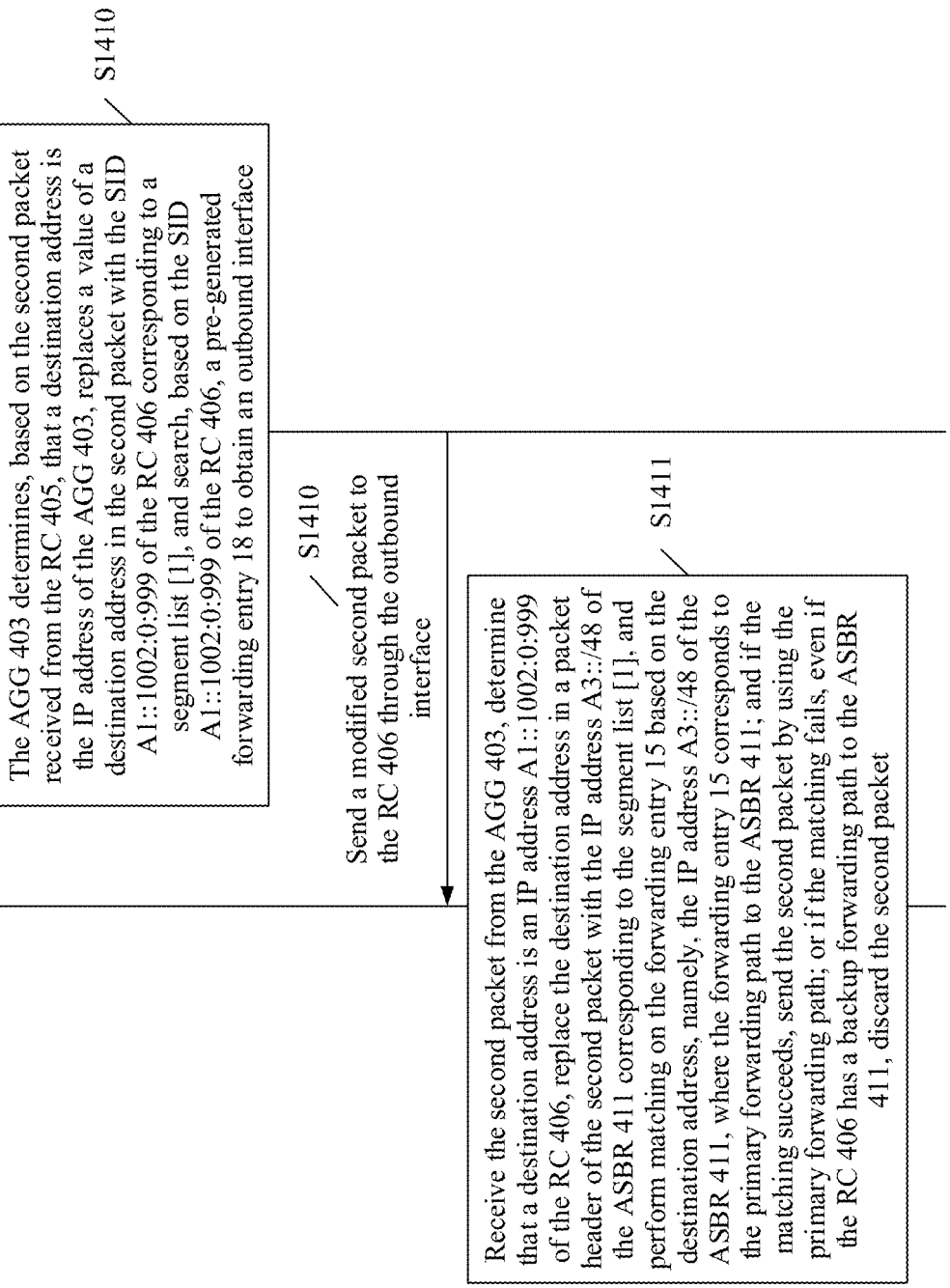

The network architecture shown in FIG. 13 is used as an example. FIG. 14A to FIG. 14C are a flowchart of a forwarding entry generation and packet sending method in the network architecture.

The forwarding entry generation and packet sending method includes the following operations.

S1401: The RC 405 obtains an IP address A3::/48 of the ASBR 411, and generates, based on the IP address A3::/48 of the ASBR 411, a forwarding entry 15 of a primary forwarding path to the ASBR 411.

In an embodiment of this application, the RC 405 may be considered as the foregoing first network device.

A next-hop network device on the primary forwarding path from the RC 405 to the ASBR 411 is the ASBR 407. Refer to Table 12. The forwarding entry 15 includes the IP address A3::/48 of the ASBR 411 and an outbound interface. The outbound interface is an outbound interface of a direct link to the ASBR 407.

TABLE 12

| Identifier of a forwarding entry | Destination address | Outbound interface |
| --- | --- | --- |
| 15 | A3::/48 | Outbound interface of a direct link to the ASBR 407 |

S1402: The RC 406 obtains an IP address A3::/48 of the ASBR 411, and generates, based on the IP address A3::/48 of the ASBR 411, a forwarding entry 16 of a primary forwarding path to the ASBR 411.

In an embodiment of this application, the RC 406 may be considered as the foregoing second network device.

A next-hop network device on the primary forwarding path from the RC 406 to the ASBR 411 is the ASBR 408. Refer to Table 13. The forwarding entry 16 includes the IP address A3::/48 of the ASBR 411 and an outbound interface. The outbound interface is an outbound interface of a direct link to the ASBR 408.

TABLE 13

| Identifier of a forwarding entry | Destination address | Outbound interface |
| --- | --- | --- |
| 16 | A3::/48 | Outbound interface of a direct link to the ASBR 408 |

S1403: The RC 406 sends an advertisement packet to the RC 405 by using the AGG 403, where the advertisement packet includes routing information of the RC 406 and a SID of the RC 406, and the SID may be an IP address A1::1002:0:999.

S1404: The RC 405 receives the advertisement packet, and generates, based on a SID of the RC 406, a tunnel to the RC 406, to obtain an outbound interface of the tunnel.

Network devices through which the tunnel passes may be the RC 405, the AGG 403, and the RC 406, and the tunnel may be considered as the foregoing first forwarding path.

S1405: The RC 405 generates a forwarding entry 17.

Refer to Table 14. The forwarding entry 17 includes the IP address of the ASBR 411, the IP address of the RC 406, and an outbound interface. Optionally, a repair list may further include the IP address A3::/48 of the ASBR 411 and the IP address A1::1001:0:888 of the AGG 403.

TABLE 14

| Identifier of a forwarding entry | Destination address | Repair list | Outbound interface |
| --- | --- | --- | --- |
| 17 | A3::/48 | A3::/48<br>A1::1001:0:888<br>A1::1002:0:999 | Outbound interface of a tunnel |

S1406: The RC 405 receives the first packet from the AGG 403, where the first packet includes the IP address A3::/48 of the ASBR 411.

In an embodiment of this application, the ASBR 411 may be considered as the foregoing destination device.

S1407: The RC 405 determines, based on the IP address of the ASBR 411, that the primary forwarding path (namely, the outbound interface of the direct link to the ASBR 407) to the ASBR 411 is faulty (for example, the forwarding entry 15 fails to be obtained through matching), and then the RC 405 obtains the forwarding entry 17 through matching based on the IP address of the ASBR 411, to obtain a SID A1::1001:0:888 f the AGG 403, a SID A1::1002:0:999 of the RC 406, and the outbound interface of the tunnel.

If the primary forwarding path to the ASBR 411 is not faulty, the RC 405 may send the first packet to the ASBR 407, so that the ASBR 407 sends the first packet to the ASBR 411 through the P device 409.

S1408: The RC 405 adds a SID list to an SRH of the first packet. The SID list includes the IP address A3::/48 of the ASBR 411, the SID A1::1001:0:888 of the AGG 403, the SID A1::1002:0:999 of the RC 406, and the third indication information, and modifies a destination address of the first packet to the IP address A1::1001:0:888 of the AGG 403, to obtain a second packet.

In an embodiment of this application, the third indication information is used to indicate the RC 406 to avoid using the backup forwarding path to send the second packet to the ASBR 411. In the second packet, the IP address A3::/48 of the ASBR 411 is a SID corresponding to a segment list [0] in the SID list, the SID A1::1002:0:999 of the RC 406 is a SID corresponding to a segment list [1] in the SID list, and the SID A1::1001:0:888 of the AGG 403 is a SID corresponding to a segment list [2] in the SID list. A value of Segment Left in the second packet is 2.

S1409: The RC 405 sends the second packet to the AGG 403.

S1410: The AGG 403 determines, based on the second packet received from the RC 405, that a destination address is the IP address of the AGG 403, replaces a value of the destination address in the second packet with the SID A1::1002:0:999 of the RC 406 corresponding to the segment list [1], searches for a pre-generated forwarding entry 18 based on the SID A1::1002:0:999 of the RC 406 to obtain an outbound interface, and sends a modified second packet to the RC 406 based on the outbound interface.

In an embodiment of this application, the AGG 403 may pre-generate, according to a shortest path method, the forwarding entry 18 to the RC 406. Refer to Table 15. The forwarding entry 18 includes a destination address and an outbound interface. The destination address is the IP address A1::1002:0:999 of the RC 406, and the outbound interface is an outbound interface communicating with the RC 406.

TABLE 15

| Identifier of a forwarding entry | Destination address | Outbound interface |
| --- | --- | --- |
| 18 | A1::1002:0:999 | Outbound interface of a direct link to the RC 406 |

S1411: RC 406 receives the second packet from the AGG 403, determines that a destination address is the IP address A1::1002:0:999 of the RC 406, replaces a destination address in a packet header of the second packet with the IP address A3::/48 of the ASBR 411 corresponding to the segment list [1], and performs matching on the forwarding entry 15 based on the destination address, namely, the IP address A3::/48 of the ASBR 411. The forwarding entry 15 corresponds to the primary forwarding path to the ASBR 411. If the matching succeeds, the RC 406 sends the second packet by using the primary forwarding path; or if the matching fails, even if the RC 406 has a backup forwarding path to the ASBR 411, the RC 406 discards the second packet.

The primary forwarding path from the RC 406 to the ASBR 411 is RC 406→ASBR 408→ASBR 410→P device 409→ASBR 411. The backup forwarding path from the RC 406 to the ASBR 411 may be, for example, RC 406→AGG 403→RC 405→ASBR 407→P device 409→ASBR 411.

Because the AGG 403 can send the second packet from the RC 405 to the RC 406 instead of returning the second packet to the RC 405, and the RC 406 can return the second packet to the RC 405 without using the backup forwarding path when the primary forwarding path to the ASBR 411 is faulty, a problem of resource waste caused by a loop that occurs in the second packet between the RC 406 and the AGG 403 is avoided.

In addition, a method for generating a forwarding entry and sending a packet when a direct link exists between the RC 405 and the RC 406, but is faulty is similar to a method in a case in which no direct link exists between the RC 405 and the RC 406 in FIG. 13, and details are not described herein again.

Figure 15:
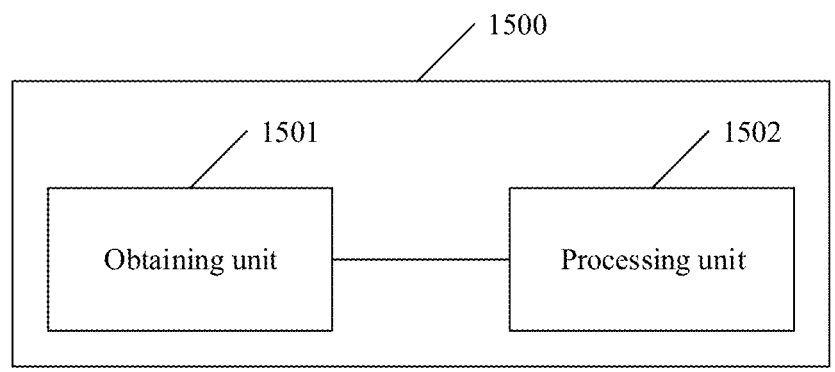
FIG. 15 is a schematic diagram of a structure of a network device 1500 according to an embodiment of this application.

FIG. 15 is a schematic diagram of a possible structure of the network device in the foregoing embodiments. The network device 1500 may implement functions of the first network device in the embodiment shown in FIG. 4. Alternatively, the network device 1500 may implement functions of the AGG 204 in the embodiment shown in FIG. 10A to FIG. 10E or FIG. 12A to FIG. 12E or the RC 405 in the embodiment shown in FIG. 13. Refer to FIG. 15. The network device 1500 includes an obtaining unit 1501 and a processing unit 1502. These units may perform corresponding functions of the first network device in the foregoing method examples. The obtaining unit 1501 is configured to support the network device 1500 in performing S402 in FIG. 4. The processing unit 1502 is configured to support the network device 1500 in performing S403 and S404 in FIG. 4, and/or another process performed by the first network device in the technology described in this specification. For example, the obtaining unit 1501 is configured to perform various obtaining operations performed by the first network device in the foregoing method embodiments; and the processing unit 1502 is configured to perform various processing operations performed by the first network device in the foregoing method embodiments. For example, the obtaining unit 1501 is configured to obtain routing information advertised by a second network device; and the processing unit 1502 is configured to determine that the routing information advertised by the second network device matches a summary route stored in the first network device, and generate, based on a segment identifier of the second network device, a forwarding entry corresponding to the summary route. For a specific execution process, refer to detailed descriptions of corresponding operations in the embodiment shown in FIG. 4, FIG. 10A to FIG. 10E, FIG. 12A to FIG. 12E, or FIG. 13. Details are not described herein again.

It should be noted that, in an embodiment of this application, division into the units is an example, and is merely a logical function division. In actual implementation, another division manner may be used. Functional units in embodiments of this application may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 16:
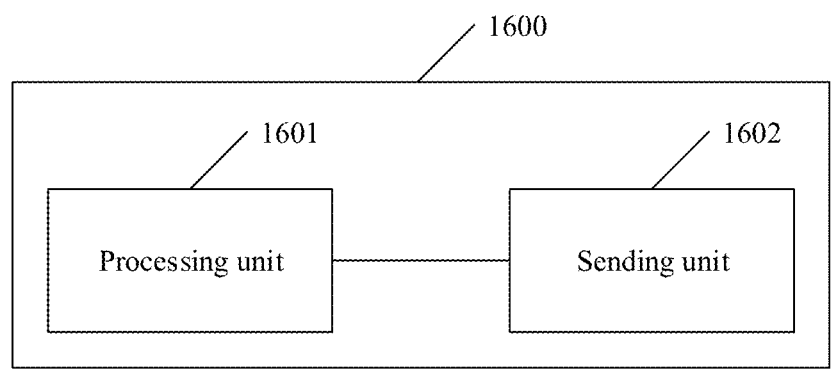
FIG. 16 is a schematic diagram of a structure of a network device 1600 according to an embodiment of this application.

FIG. 16 is a schematic diagram of a possible structure of the network device in the foregoing embodiments. The network device 1600 may implement functions of the second network device in the embodiment shown in FIG. 4. Alternatively, the network device 1600 may implement functions of the AGG 205 in the embodiment shown in FIG. 10A to FIG. 10E or FIG. 12A to FIG. 12E or the RC 406 in the embodiment shown in FIG. 13. Refer to FIG. 16. The network device 1600 includes a processing unit 1601 and a sending unit 1602. These units may perform corresponding functions of the second network device in the foregoing method examples. For example, the processing unit 1601 is configured to generate a first advertisement packet. The first advertisement packet includes a segment identifier of the second network device. The sending unit 1602 is configured to send the first advertisement packet to the first network device. For a specific execution process, refer to detailed descriptions of corresponding operations in the embodiment shown in FIG. 4, FIG. 10A to FIG. 10E, FIG. 12A to FIG. 12E, or FIG. 13. Details are not described herein again.

Figure 17:
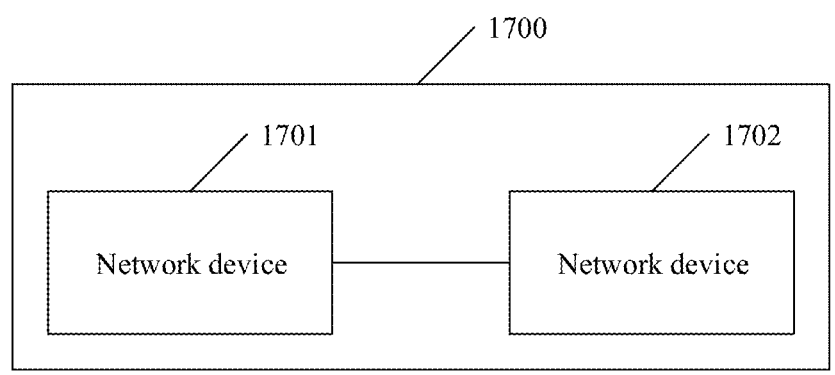
FIG. 17 is a schematic diagram of a structure of a packet sending system 1700 according to an embodiment of this application.

Refer to FIG. 17. An embodiment of the present disclosure provides a packet processing system 1700. The system 1700 is configured to implement the forwarding entry generation method and the packet sending method in the foregoing method embodiments. The system 1700 includes a network device 1701 and a network device 1702. The network device 1701 may implement functions of the first network device in the embodiment shown in FIG. 4 or functions of the network device 1500 in FIG. 15. The network device 1702 may implement functions of the second network device in the embodiment shown in FIG. 4 or functions of the network device 1600 in FIG. 16. The network device 1701 may further implement functions of the AGG 204 in the embodiment shown in FIG. 10A to FIG. 10E or FIG. 12A to FIG. 12E or the RC 405 in the embodiment shown in FIG. 13. The network device 1701 may further implement functions of the AGG 205 in the embodiment shown in FIG. 10A to FIG. 10E or FIG. 12A to FIG. 12E or the RC 406 in the embodiment shown in FIG. 13. For a specific execution process, refer to detailed descriptions of corresponding operations in the embodiment shown in FIG. 4, FIG. 10A to FIG. 10E, FIG. 12A to FIG. 12E, or FIG. 13. Details are not described herein again.

Figure 18:
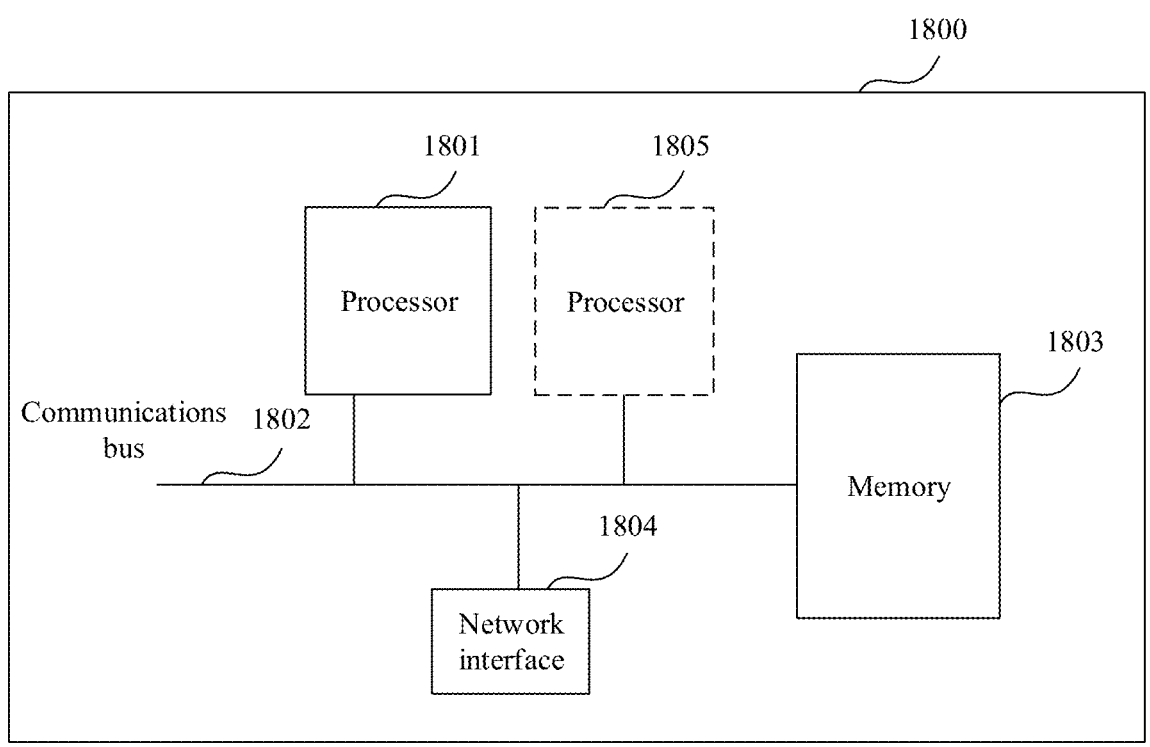
FIG. 18 is a schematic diagram of a structure of a device 1800 according to an embodiment of this application.

FIG. 18 is a schematic diagram of a structure of a device 1800 according to an embodiment of this application. The network device 1500 in FIG. 15 and the network device 1600 in FIG. 16 may be implemented by using the device shown in FIG. 18. Refer to FIG. 18. The device 1800 includes at least one processor 1801, a communications bus 1802, and at least one network interface 1804. Optionally, the device 1800 may further include a memory 1803.

The processor 1801 may be a general-purpose central processing unit (CPU), an application-specific integrated circuit (ASIC), or one or more integrated circuits (IC) for controlling program execution of the solutions of this application. The processor may be configured to process a packet, to implement the packet sending method provided in the embodiments of this application.

For example, when the first network device in FIG. 4 is implemented by the device shown in FIG. 18, the processor may be configured to obtain routing information advertised by a second network device, and when it is determined that the routing information advertised by the second network device matches a summary route stored in the first network device, the first network device generates, based on a segment identifier of the second network device, a forwarding entry corresponding to the summary route. For specific function implementation, refer to the processing part corresponding to the first network device in the method embodiment. For another example, when the second network device in FIG. 4 is implemented by using the device shown in FIG. 18, the processor may be configured to generate a first advertisement packet. The first advertisement packet includes a segment identifier of the second network device. The second network device sends the first advertisement packet to a first network device. The first advertisement packet is used to indicate the first network device to generate, when it is determined that routing information advertised by the second network device matches a summary route stored in the first network device, a forwarding entry corresponding to the summary route. The forwarding entry includes the segment identifier of the second network device, and a forwarding path corresponding to the forwarding entry passes through the second network device. For specific function implementation, refer to the processing part of the second network device in the method embodiment.

The communications bus 1802 is configured to transmit information between the processor 1801, the network interface 1804, and the memory 1803.

The memory 1803 may be a read-only memory (ROM) or another type of static storage device that may store static information and instructions. The memory 1803 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of an instruction or a data structure and that can be accessed by a computer. However, the memory is not limited thereto. The memory 1803 may exist independently, and be connected to the processor 1801 by using the communications bus 1802. Alternatively, the memory 1803 may be integrated with the processor 1801.

Optionally, the memory 1803 is configured to store program code or instructions for executing the solutions of this application, and the processor 1801 controls the execution. The processor 1801 is configured to execute the program code or the instructions stored in the memory 1803. The program code may include one or more software modules. Optionally, the processor 1801 may alternatively store the program code or the instructions for executing the solutions of this application. In this case, the processor 1801 does not need to read the program code or the instructions from the memory 1803.

The network interface 1804 may be an apparatus such as a transceiver, and is configured to communicate with another device or a communications network. The communications network may be an Ethernet, a radio access network (RAN), a wireless local area network (WLAN), or the like. In this embodiment of this application, the network interface 1804 may be configured to receive a packet sent by another node in a segment routing network, or may send a packet to another node in a segment routing network. The network interface 1804 may be an Ethernet interface, a fast Ethernet (FE) interface, a gigabit Ethernet (GE) interface, or the like.

During specific implementation, in an embodiment, the device 1800 may include a plurality of processors such as the processor 1801 and a processor 405 in FIG. 18. Each of the processors may be a single-core (single-CPU) processor, or may be a multi-core (multi-CPU) processor. The processor herein may be one or more devices, circuits, and/or processing cores configured to process data (for example, computer program instructions).

Figure 19:
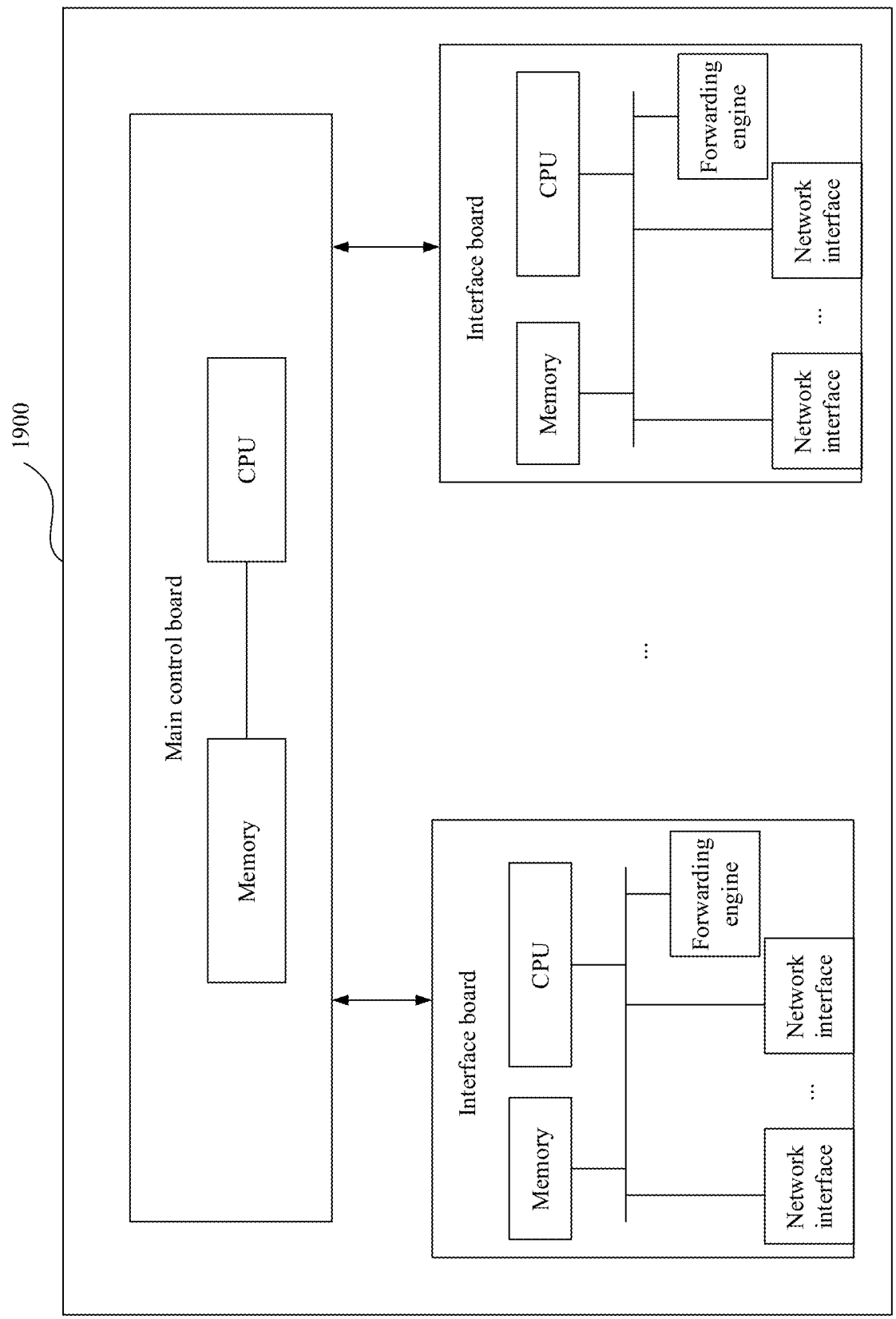
FIG. 19 is a schematic diagram of a structure of a device 1900 according to an embodiment of this application.

FIG. 19 is a schematic diagram of a structure of a device 1900 according to an embodiment of this application. The first network device and the second network device in FIG. 4 may be implemented by using the device shown in FIG. 19. Refer to the schematic diagram of the structure of the device shown in FIG. 19. The device 1900 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 1900, including route computation, and device management and maintenance functions. The interface board is also referred to as a line processing unit (LPU) or a line card (line card), and is configured to receive and send a packet. In some embodiments, the main control board communicates with the interface board through a bus, or the interface boards communicate with each other through a bus. In some embodiments, the interface boards communicate with each other through a switching board. In this case, the device 1900 also includes a switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (interface card, IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding information table. The forwarding engine is configured to forward a received packet based on the forwarding information table stored in the memory. If a destination address of the received packet is an IP address of the device 1900, the forwarding engine sends the packet to the CPU of the main control board or the CPU of the interface board for processing. If a destination address of the received packet is not an IP address of the device 1900, the forwarding engine searches the forwarding information table based on the destination address. If a next hop and an outbound interface that correspond to the destination address are found from the forwarding information table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform a function of the forwarding engine, for example, implementing software forwarding based on a general-purpose CPU, so that no forwarding engine is required in the interface board. In some embodiments, the forwarding engine may be implemented by using an ASIC or a field programmable gate array (FPGA). In some embodiments, the memory that stores the forwarding information table may alternatively be integrated in the forwarding engine, and is used as a part of the forwarding engine.

An embodiment of this application further provides a chip system, including a processor. The processor is coupled to a memory, and the memory is configured to store a program or instructions. When the program or the instructions are executed by the processor, the chip system is enabled to implement the method of the first network device or the second network device in the embodiment shown FIG. 4.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. Optionally, there may also be one or more memories in the chip system. The memory may be integrated with the processor, or may be separated from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be an FPGA, an ASIC, a system on chip (SoC), a CPU, an NP, a digital signal processor (DSP), a micro controller unit (MCU), a programmable logic device (PLD), or another integrated chip.

It should be understood that operations in the foregoing method embodiments may be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module.

An embodiment of this application further provides a computer-readable storage medium, including instructions. When the instructions are run on a computer, the computer is enabled to perform the methods in the embodiments.

In the specification, claims, and accompanying drawings of this application, the terms "first", "second", "third", "fourth", and the like are intended to distinguish similar objects but do not need to be used to describe a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

In this application, "at least one" means one or more, and "a plurality of" means two or more. The term "at least one of the following items (pieces)" or an expression similar to the term indicates any combination of the items, and includes a single item (piece) or any combination of a plurality of items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical module division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be obtained depending on an actual requirement to implement the objectives of the solutions in the embodiments.

In addition, module units in embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for generating forwarding entries, comprising:
obtaining, by a first network device, routing information advertised by a second network device;
determining, by the first network device, that the routing information matches a summary route stored in the first network device, wherein the summary route includes a summary that summarizes at least one route corresponding to a destination address; and
generating, based on a segment identifier of the second network device, a forwarding entry corresponding to the summary route, wherein the forwarding entry comprises the segment identifier of the second network device and a forwarding path corresponding to the forwarding entry passes through the second network device,
wherein the forwarding entry is a backup forwarding entry corresponding to the summary route, a primary forwarding entry corresponding to the summary route does not pass through the second network device, and the method further comprises:
setting, by the first network device, the primary forwarding entry to an unavailable state.

2. The method according to claim 1, wherein before generating the forwarding entry corresponding to the summary route, the method further comprises:
receiving, by the first network device, a first advertisement packet, wherein the first advertisement packet comprises the segment identifier of the second network device.

3. The method according to claim 2, wherein the first advertisement packet further comprises first indication information, and the method further comprises:
matching, by the first network device based on the first indication information, the routing information against the summary route stored in the first network device; and
when it is determined that the routing information matches the summary route stored in the first network device, generating, based on the segment identifier of the second network device, the forwarding entry corresponding to the summary route.

4. The method according to claim 2, wherein the first advertisement packet comprises the routing information advertised by the second network device; and
wherein obtaining the routing information comprises:
obtaining, by the first network device from the first advertisement packet, the routing information advertised by the second network device.

5. The method according to claim 2, wherein the first advertisement packet further comprises a device identifier of the second network device; and
wherein obtaining the routing information comprises:
obtaining, by the first network device, the routing information advertised by the second network device based on the device identifier of the second network device and a correspondence between the device identifier of the second network device and the routing information advertised by the second network device.

6. The method according to claim 5, further comprising:
receiving, by the first network device, a second advertisement packet that comprises the device identifier of the second network device and the routing information advertised by the second network device; and
generating, by the first network device, the correspondence based on the device identifier of the second network device and the routing information advertised by the second network device.

7. The method according to claim 3, wherein the first advertisement packet comprises a segment routing over Internet protocol version 6 (SRv6) endpoint segment identifier (END SID) type length value (TLV), and the first indication information is carried in a Flags field, an Endpoint Behavior field, or a reserved field in the SRv6 END SID TLV.

8. The method according to claim 3, wherein the first advertisement packet comprises a non-bypass segment identifier type length value (NoBypass SID TLV); and a Type field of the NoBypass SID TLV carries the first indication information; or a Type field of the NoBypass SID TLV carries second indication information, an Endpoint Behavior field of the NoBypass SID TLV carries the first indication information, and the second indication information is used to indicate that the Endpoint Behavior field carries the first indication information.

9. The method according to claim 2, wherein the first advertisement packet is an open shortest path first (OSPF) packet or an intermediate system to intermediate system (ISIS) packet.

10. The method according to claim 1, wherein determining that the routing information advertised by the second network device matches the summary route comprises:
determining, by the first network device, that a prefix in the routing information advertised by the second network device is the same as a prefix of the summary route and that a mask in the routing information advertised by the second network device is the same as a mask of the summary route.

11. The method according to claim 1, further comprising:
receiving, by the first network device, a first packet having a destination address matching the summary route;
adding, by the first network device, the segment identifier of the second network device to a packet header of the first packet to obtain a second packet; and
sending, by the first network device, the second packet to the second network device based on the segment identifier of the second network device.

12. The method according to claim 11, wherein the second packet comprises third indication information that is used to indicate the second network device to avoid using a backup forwarding path from the second network device to a destination device to forward the second packet.

13. A method for sending packets, comprising:
generating, by a second network device, a first advertisement packet having a segment identifier of the second network device; and
sending, by the second network device, the first advertisement packet to a first network device to instruct the first network device to generate, when it is determined that routing information advertised by the second network device matches a summary route stored in the first network device, a forwarding entry corresponding to the summary route, wherein the forwarding entry comprises the segment identifier of the second network device and a forwarding path corresponding to the forwarding entry through the second network device, wherein the summary route includes a summary that summarizes at least one route corresponding to a destination address,
wherein the forwarding entry is a backup forwarding entry corresponding to the summary route, a primary forwarding entry corresponding to the summary route does not pass through the second network device, and wherein
the primary forwarding entry is set by the first network device to an unavailable state.

14. The method according to claim 13, wherein the first advertisement packet further comprises first indication information that is used to indicate the first network device to generate the forwarding entry corresponding to the summary route, when it is determined that the routing information matches the summary route stored in the first network device.

15. The method according to claim 14, wherein the first advertisement packet comprises a segment routing over Internet protocol version 6 (SRv6) endpoint segment identifier (END SID) type length value (TLV), and the first indication information is carried in a Flags field, an Endpoint Behavior field, or a reserved field in the SRv6 END SID TLV.

16. The method according to claim 14, wherein the first advertisement packet comprises a non-bypass segment identifier type length value (NoBypass SID TLV); and a Type field of the NoBypass SID TLV carries the first indication information; or a Type field of the NoBypass SID TLV carries second indication information, an Endpoint Behavior field of the NoBypass SID TLV carries the first indication information, and the second indication information is used to indicate that the Endpoint Behavior field carries the first indication information.

17. The method according to claim 13, further comprising:
sending, by the second network device, a second advertisement packet to the first network device, wherein the second advertisement packet comprises the routing information advertised by the second network device.

18. The method according to claim 17, wherein the first advertisement packet and the second advertisement packet each further comprise a device identifier of the second network device.

19. The method according to claim 13, further comprising:
generating, by the second network device, a correspondence between an identifier of the second network device and third indication information that is used to indicate the second network device to avoid using a backup forwarding path from the second network device to a destination device to forward a packet.

20. The method according to claim 13, wherein the first advertisement packet further comprises the routing information advertised by the second network device.

21. The method according to claim 13, wherein the first advertisement packet is an open shortest path first (OSPF) packet or an intermediate system to intermediate system (ISIS) packet.

22. A network device operating as a first network device, comprising:
a memory comprising instructions;
a processor coupled to the memory, wherein when the instructions are executed by the processor, cause the first network device to:
obtain routing information advertised by a second network device, wherein the first network device and the second network device are part of a network system comprising a plurality of network devices,
determine that the routing information matches a summary route stored in the first network device, wherein the summary route includes a summary that summarizes at least one route corresponding to a destination address, and
generate, based on a segment identifier of the second network device, a forwarding entry corresponding to the summary route, wherein the forwarding entry comprises the segment identifier of the second network device and a forwarding path corresponding to the forwarding entry through the second network device,
wherein the forwarding entry is a backup forwarding entry corresponding to the summary route, a primary forwarding entry corresponding to the summary route does not pass through the second network device, and the method further comprises:
setting, by the first network device, the primary forwarding entry to an unavailable state.

23. The network device according to claim 22, wherein the instructions further cause the network device to:
receive a first advertisement packet having the segment identifier of the second network device, prior to generating the forwarding entry corresponding to the summary route based on the segment identifier of the second network device.

24. The network device according to claim 23, wherein the first advertisement packet further comprises first indication information; and the instructions further cause the network device to:
match, based on the first indication information, the routing information advertised by the second network device against the summary route stored in the first network device, and
generate, based on the segment identifier of the second network device, the forwarding entry corresponding to the summary route, when it is determined that the routing information matches the summary route stored in the first network device.

25. A network device operating as a second network device, comprising:
a memory comprising instructions;
a processor coupled to the memory, wherein when the instructions are executed by the processor, cause the second network device to:
generate a first advertisement packet, wherein the first advertisement packet comprises a segment identifier of the second network device; and
send the first advertisement packet to a first network device, wherein the first network device and the second network device are part of a network system comprising a plurality of network devices, wherein the first advertisement packet is used to instruct the first network device to generate, when it is determined that routing information advertised by the second network device matches a summary route stored in the first network device, a forwarding entry corresponding to the summary route; the forwarding entry comprises a segment identifier of the second network device and a forwarding path corresponding to the forwarding entry through the second network device, wherein the summary route includes a summary that summarizes at least one route corresponding to a destination address, wherein the forwarding entry is a backup forwarding entry corresponding to the summary route, a primary forwarding entry corresponding to the summary route does not pass through the second network device, and wherein the primary forwarding entry is set by the first network device to an unavailable state.

26. The network device according to claim 25, wherein the first advertisement packet further comprises first indication information that is used to instruct the first network device to generate the forwarding entry corresponding to the summary route, when it is determined that the routing information advertised by the second network device matches the summary route stored in the first network device.

27. The network device according to claim 26, wherein the first advertisement packet comprises a segment routing over Internet protocol version 6 (SRv6) endpoint segment identifier an (SRv6 END SID TLV), and the first indication information is carried in a Flags field, an Endpoint Behavior field, or a reserved field in the SRv6 END SID TLV.

28. The network device according to claim 26, wherein the first advertisement packet comprises a non-bypass segment identifier type length value (NoBypass SID TLV); and a Type field of the NoBypass SID TLV carries the first indication information; or a Type field of the NoBypass SID TLV carries second indication information, an Endpoint Behavior field of the NoBypass SID TLV carries the first indication information, and the second indication information is used to indicate that the Endpoint Behavior field carries the first indication information.

29. The network device according to claim 25, wherein the instructions further cause the network device to:
send a second advertisement packet to the first network device, wherein the second advertisement packet comprises the routing information advertised by the second network device.

* * * * *